US012361804B2

(12) United States Patent
Helman et al.

(10) Patent No.: US 12,361,804 B2
(45) Date of Patent: *Jul. 15, 2025

(54) MERCHANDISE SECURITY SYSTEM

(71) Applicant: InVue Security Products Inc., Charlotte, NC (US)

(72) Inventors: Christopher Richard Helman, Charlotte, NC (US); Kyle Baker, Lancaster, SC (US); Jonathon D. Phillips, Fort Mill, SC (US); Daniel G. Dugas, Charlotte, NC (US); Michael R. Johnston, Waxhaw, NC (US); Daniel C. Symons, Waxhaw, NC (US); A. Reneau Van Landingham, Jr., Gastonia, NC (US); Eric Brutke, Tega Cay, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,513

(22) Filed: Nov. 28, 2023

(65) Prior Publication Data

US 2024/0112554 A1 Apr. 4, 2024

Related U.S. Application Data

(63) Continuation of application No. 17/889,033, filed on Aug. 16, 2022, now Pat. No. 11,869,320, which is a (Continued)

(51) Int. Cl.

*G08B 13/14* (2006.01)
*A47F 5/00* (2006.01)

(Continued)

(52) U.S. Cl.

CPC ........... *G08B 13/1454* (2013.01); *A47F 5/00* (2013.01); *A47F 7/00* (2013.01); *E05B 73/0011* (2013.01);

(Continued)

(58) Field of Classification Search

CPC ........... G08B 13/1454; G08B 13/1409; G08B 13/1463; G08B 13/14; E05B 73/0011

See application file for complete search history.

(56) References Cited

U.S. PATENT DOCUMENTS 7,168,275 B2 1/2007 Fawcett et al.
8,632,040 B2 1/2014 Mass et al.

(Continued)

FOREIGN PATENT DOCUMENTS

CN 104737091 A 6/2015
CN 204378633 U 6/2015

(Continued)

OTHER PUBLICATIONS

International Search Report and Written Opinion from corresponding International Application No. PCT/US2018/15000, dated May 10, 2018 (13 pages).

(Continued)

*Primary Examiner* — John A Tweel, Jr.

(74) *Attorney, Agent, or Firm* — InVue Security Products Inc.

(57) ABSTRACT

Embodiments of the present invention are directed to security systems for securing an item of merchandise from theft or unauthorized removal. For example, the security system may include a sensor configured to be coupled to the item of merchandise, wherein the sensor includes an electrical connector. The security system also includes a base configured to removably support the sensor thereon, wherein the base includes an electronics module having a connector. The (Continued)

connector of the sensor and the connector of the electronics module are configured to electrically connect with one another when the sensor is supported on the base, and the sensor is configured to detect unauthorized removal of the item of merchandise from the sensor.

22 Claims, 22 Drawing Sheets

Related U.S. Application Data continuation of application No. 17/184,068, filed on Feb. 24, 2021, now Pat. No. 11,450,185, which is a continuation of application No. 16/480,427, filed as application No. PCT/US2018/015000 on Jan. 24, 2018, now abandoned.

(60) Provisional application No. 62/589,712, filed on Nov. 22, 2017, provisional application No. 62/450,371, filed on Jan. 25, 2017.

(51) Int. Cl.
*A47F 7/00* (2006.01)
*E05B 73/00* (2006.01)

(52) U.S. Cl.
CPC ..... *G08B 13/1409* (2013.01); *G08B 13/1463* (2013.01)

(56) References Cited

U.S. PATENT DOCUMENTS

| | | | |
|---|---|---|---|
| 8,736,450 | B2 | 5/2014 | Brown et al. |
| 8,833,115 | B2 | 9/2014 | Nakasuji |
| 8,847,759 | B2 | 9/2014 | Bisesti et al. |
| 9,105,168 | B2 | 8/2015 | Shute et al. |
| 9,163,433 | B2 | 10/2015 | Sedon |
| 9,500,010 | B2 | 11/2016 | Lin |
| 10,111,537 | B2 | 10/2018 | Johnston et al. |
| 10,206,522 | B2 | 2/2019 | Yang et al. |
| 10,918,224 | B2 | 2/2021 | Johnston et al. |
| 11,176,791 | B2 | 11/2021 | Taylor |
| 11,293,202 | B2 * | 4/2022 | Moock ................ E05B 47/0012 |
| 11,450,185 | B2 | 9/2022 | Helman et al. |
| 11,869,320 | B2 * | 1/2024 | Helman .................. A47F 7/024 |
| 2004/0100807 | A1 | 5/2004 | MacDonald et al. |
| 2011/0100073 | A1 | 5/2011 | Johnston et al. |
| 2011/0283754 | A1 | 11/2011 | Ezzo et al. |
| 2012/0188082 | A1 | 7/2012 | Berglund et al. |
| 2013/0241731 | A1 | 9/2013 | Fawcett et al. |
| 2015/0300050 | A1 | 10/2015 | Van Balen |
| 2015/0317887 | A1 | 11/2015 | Fawcett et al. |
| 2016/0055728 | A1 | 2/2016 | Grant |
| 2016/0201359 | A1 | 7/2016 | Berglund et al. |
| 2016/0351029 | A1 | 12/2016 | Fawcett et al. |
| 2019/0059612 | A1 | 2/2019 | Johnston et al. |
| 2019/0392690 | A1 | 12/2019 | Helman et al. |
| 2020/0178704 | A1 | 6/2020 | Johnston et al. |

FOREIGN PATENT DOCUMENTS

| | | | |
|---|---|---|---|
| CN | 105210123 | A | 12/2015 |
| CN | 205644859 | U | 10/2016 |
| WO | 2014160758 | A1 | 10/2014 |
| WO | 2015112670 | A1 | 7/2015 |
| WO | 2016014614 | A1 | 1/2016 |
| WO | 2016033037 | A1 | 3/2016 |
| WO | 2016160895 | A1 | 10/2016 |
| WO | 2016191455 | A1 | 12/2016 |

OTHER PUBLICATIONS

Crider, Michael. "Everything You Want to Know About USB 3.1 and Type C." Sep. 26, 2016. <retrieved on Mar. 16, 2018 from URL: https://www.digitaltrends.com/computing/what-is-usb-3-1-when-will-it-be-released-and-what-will-it-do-for-pcs/> (13 pages).

Extended European Search Report for corresponding European Patent Application No. 18744495.5, dated Jul. 13, 2020 (8 pages).

Office Action from corresponding Chinese Patent Application No. 201880014758.7, dated Oct. 19, 2020 (9 pages).

The Second Office Action from Chinese National Intellectual Property Administration from corresponding Chinese Application No. 202111025431.X, dated Jun. 2, 2023 (6 pages).

First Office Action from corresponding Chinese Patent Application No. 202111025431, dated Jul. 26, 2022 (8 pages).

* cited by examiner

MERCHANDISE SECURITY SYSTEM

CROSS REFERENCE TO RELATED APPLICATIONS

This application is a continuation of U.S. application Ser. No. 17/889,033 filed on Aug. 16, 2022, which is a continuation of U.S. application Ser. No. 17/184,068, filed on Feb. 24, 2021 and now U.S. Pat. No. 11,450,185, which is a continuation of U.S. application Ser. No. 16/480,427, filed on Jul. 24, 2019, which is a 371 National Phase Entry of International Application No. PCT/US2018/015000, filed on Jan. 24, 2018, which claims the benefit of priority to U.S. Provisional Application No. 62/450,371 filed on Jan. 25, 2017, and U.S. Provisional Application No. 62/589,712 filed on Nov. 22, 2017, the entire disclosures of which are incorporated herein by reference.

BACKGROUND OF THE INVENTION

Embodiments of the present invention relate generally to security systems for protecting items of merchandise, such as consumer electronics products.

It is common practice for retailers to provide demonstration models of relatively expensive consumer electronics products, such as handheld devices, tablets, and laptop computers, so that a potential purchaser may examine the product more closely and test the operation of its features. A working demonstration model, however, increases the possibility that the demonstration model will be stolen or removed from the display area by an unauthorized person. As a result, demonstration models of consumer electronics products are typically protected by a security system that permits a potential purchaser to examine and operate the product, while reducing the likelihood that the demonstration model will be stolen or removed from the display area.

The security system displays an item of merchandise so that a potential purchaser can readily view and, in some instances, operate the item when making a decision whether to purchase the item. At the same time, the item of merchandise is usually physically secured on the security system so as to prevent, or at least deter, theft of the item. The merchandise display security system may also include an alarm that is activated to alert store personnel in the event that a shoplifter attempts to separate the item of merchandise from the security system.

BRIEF SUMMARY

Embodiments of the present invention are directed towards security systems, sensor assemblies, and methods for securing an item of merchandise from theft or unauthorized removal. In one embodiment, a security system includes a bracket configured to be attached to an item of merchandise and a sensor configured to releasably engage the bracket. The security system also includes a flexible circuit with a connector configured to removably engage an input port of the item of merchandise and configured to be in electrical communication with the sensor, wherein the sensor is configured to detect unauthorized removal of the sensor or the connector from the item of merchandise.

In one embodiment, a sensor assembly includes a bracket configured to be attached to an item of merchandise and a sensor configured to releasably engage the bracket such that the sensor is removable from the bracket. The sensor assembly further includes a bracket assembly having at least one bracket arm configured to engage a side of the item of merchandise, wherein the bracket assembly is configured to prevent removal of the sensor from the bracket.

In one embodiment, a method includes attaching a bracket to an item of merchandise and engaging a sensor with the bracket. The method also includes engaging a connector of a flexible circuit with an input port of the item of merchandise to establish electrical communication with the sensor, wherein the sensor is configured to detect unauthorized removal of the sensor or the connector from the item of merchandise.

In another embodiment, a security system includes a sensor configured to be coupled to the item of merchandise, the sensor comprising an electrical connector, and a base configured to removably support the sensor thereon, the base comprising an electronics module having an electrical connector. The electrical connector of the sensor and the electrical connector of the electronics module are configured to electrically connect with one another when the sensor is supported on the base, and the sensor is configured to detect unauthorized removal of the item of merchandise from the sensor.

DETAILED DESCRIPTION OF EMBODIMENTS OF THE INVENTION

Figure 1:
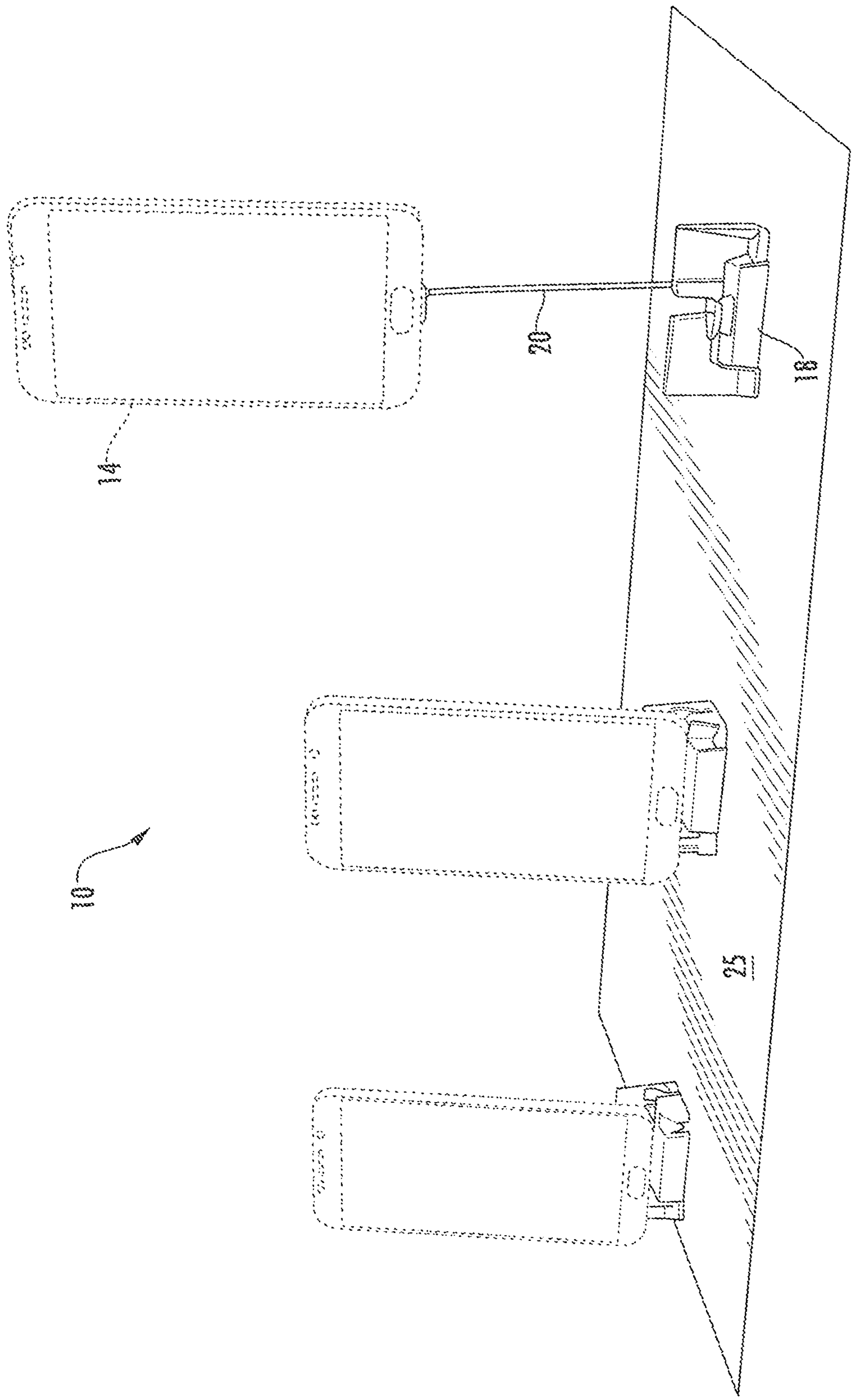
FIG. 1 is a perspective view of a security system according to one embodiment of the present invention.

Referring to the accompanying figures wherein identical reference numerals denote the same elements throughout the various views, embodiments of security systems according to the present invention for protecting an item of merchandise against theft or unauthorized removal are disclosed. The item of merchandise may be any item, including any number of consumer electronics products (e.g. hand-held device, cellular phone, smart phone, tablet, laptop computer, wearables, etc.). The security systems described herein are operable for securing the item of merchandise against theft or authorized removal, while at the same time permitting a potential purchaser to closely examine and operate the item of merchandise in a display area. The security system permits a potential purchaser to examine and test the item of merchandise, while reducing the likelihood that the item of merchandise will be stolen or removed from the display area by an unauthorized person. The systems shown and described herein are suitable for securing an item of merchandise in a residential or commercial environment, as well as a retail environment, and furthermore, is not intended to be limited to use only as a security display device for protecting against theft and/or unauthorized removal.

Figure 2:
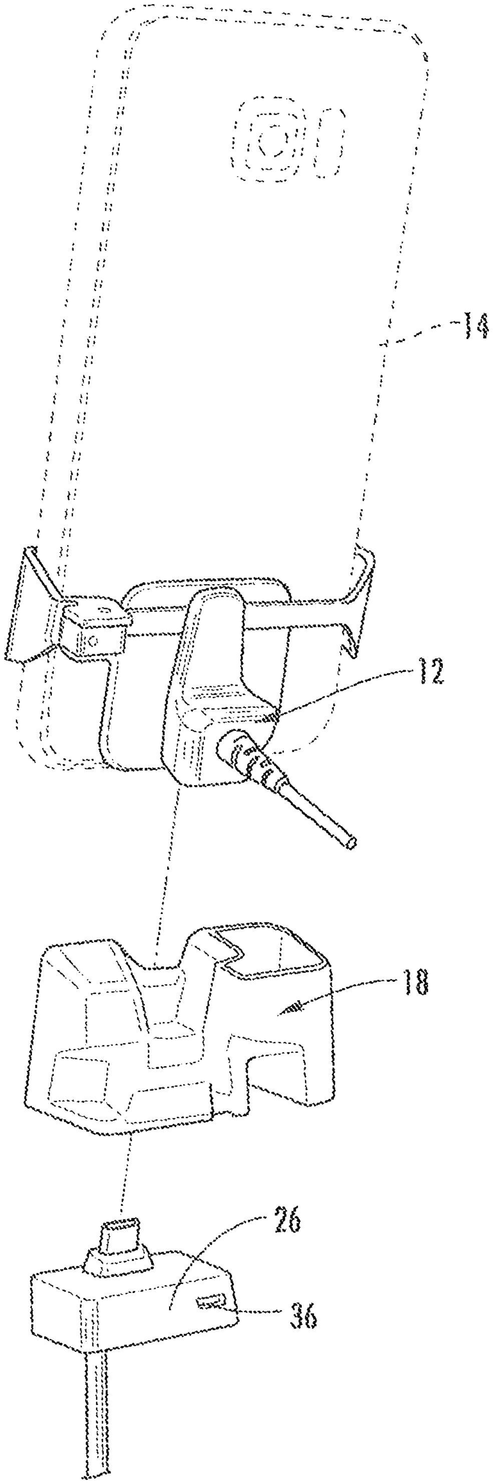
FIG. 2 is a rear perspective view of a sensor and a base of the security system shown in FIG. 1.
Figure 3:
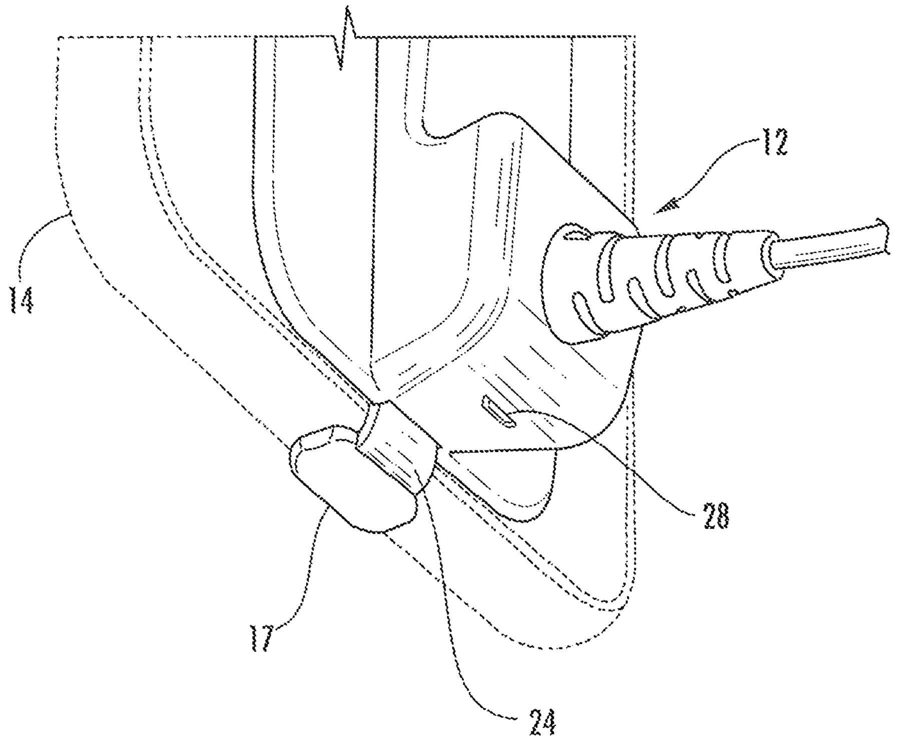
FIG. 3 is an enlarged perspective view of a sensor of the security system shown in FIG. 1.

According to one embodiment shown in FIGS. 1-3, a security system 10 generally comprises a sensor 12 configured to be secured to an item of merchandise 14. The sensor 12 may be electrically connected to a connector 17 that is configured to electrically connect to an input jack of the item of merchandise 14. The security system 10 may also include a base 18 that is configured to removably support the sensor 12 and the item of merchandise 14 thereon. In some embodiments, the security system 10 may also include a cable 20 that is coupled to the sensor 12 at one end and operably engaged with a recoiler 22 at an opposite end (see, e.g., FIG. 10). As explained in further detail below, in one embodiment a sense circuit or loop is defined through the cable 20 and may be used to detect various security events associated with the cable 20, such as the cable being cut, shorted, and/or disconnected. The cable 20 may also allow for charging of the item of merchandise 14 and/or power source carried by the sensor 12. The sensor 12 may detect security events associated with the sensor and/or the item of merchandise 14, such as the item of merchandise being removed from the sensor.

The sensor 12 may be secured to the item of merchandise 14 using any desired technique, such as an adhesive and/or mechanical brackets. The sensor 12 may have a variety of shapes and sizes for being secured to the item of merchandise 14. As shown in FIG. 2, the sensor 12 may only be secured to a rear surface of the item of merchandise 14. In some cases, the sensor 12 is configured to support the item of merchandise 14 in a desired display orientation (e.g., a vertical orientation). In addition, the connector 17 may be configured to be removably inserted into the input jack of the item of merchandise 14. Thus, the sensor 12 and the item of merchandise 14 may be electrically connected via the connector 17. The sensor 12 may include a printed circuit board (PCB), circuitry, or the like. For example, the sensor 12 may include charging circuitry for facilitating power transfer between the base 18 and the item of merchandise 14.

Figure 14:
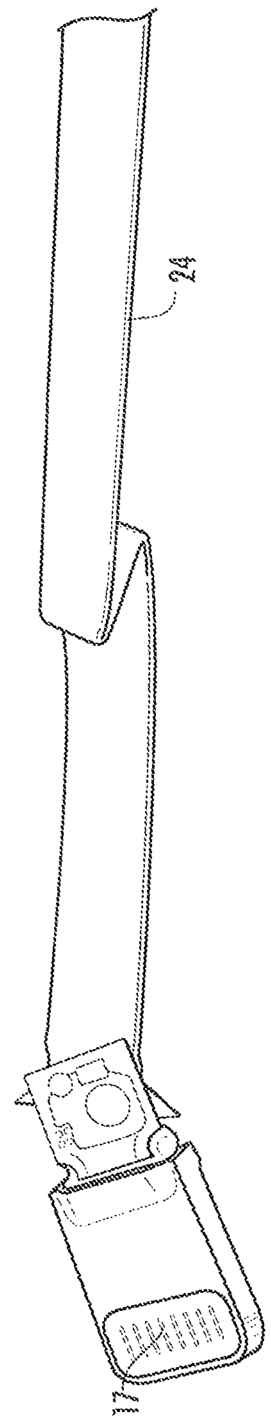
FIG. 14 is a plan view of a flexible circuit and a connector according to one embodiment of the present invention.

The connector 17 may be electrically connected to the PCB in the sensor 12 using various techniques, such as via a cable or a flexible circuit. In one embodiment, a flexible circuit 24 includes one or more conductors and is electrically connected to the PCB at one end and the connector 17 at the opposite end, such as via direct soldering the flexible circuit to both the PCB and the connector (see, e.g., FIG. 14). The flexible circuit 24 eliminates the need for a separate external cable extending from the sensor 12 to the item of merchandise 14, while facilitating electrical communication with the item of merchandise. The flexible circuit 24 itself also does not include a PCB and therefore may only include one or more conductors disposed within a flexible substrate. Moreover, the flexible circuit 24 has a low profile that allows the footprint of the sensor 12 to remain small, as well as allow flexibility in routing the connector 17 to various locations on the item of merchandise. Thus, rather than using a conventional cable (e.g., a round or helical cable), the flexible circuit 24 provides a very low profile connection between the sensor 12 and the connector 17. In some examples, the flexible circuit 24 may have a width of less than 5 mm, less, than 3 mm, or less than 1 mm. In other examples, the flexible circuit 24 may have an aspect ratio (width-to-thickness) of at least 2, at least 3, at least 4, at least 5, or at least 10. In one example shown in FIG. 3, the flexible circuit 24 extends from the connector 17 and conforms to a rear surface and/or a bottom edge of the item of merchandise 14. In this example, the sensor 12 is only located on the rear surface of the item of merchandise. In the illustrated embodiment, the connector 17 is mounted to and extends from the sensor 12 but could be positioned at other locations depending on the location of the input port of the item of merchandise 14.

The base 18 or display stand may be configured to be supported by a fixed support or display surface 25, such as a counter, shelf, fixture, or the like. The base 18 may be secured to the support surface using any desired technique such as an adhesive, brackets, and/or fasteners. In one embodiment shown in FIG. 2, the base 18 may include an electronics module 26. It is understood that the base 18 and electronics module 26 may be separate components and mated together or may be integrated into a single component in some cases. Thus, in some cases, the base 18 may not include any electrical components. The base 18 or electronics module 26 may include one or more electrical contacts 38 for electrically communicating with the sensor 12, as described in greater detail below.

Moreover, FIG. 2 shows that the electronics module 26 may include an auxiliary port 36. for connecting to corresponding auxiliary devices for the item of merchandise 14. Thus, in addition to communicating with an item of merchandise 14, the electronics module 26 may be configured to electrically connect to an auxiliary device, such as, for example, an auxiliary device for the item of merchandise 14 on display (e.g., a stylus, speaker, keyboard, Bluetooth device, etc.). The auxiliary port 36 may be an input port (e.g., a micro-USB or USB-C port) that is configured to receive a corresponding input connector on the auxiliary device (see, e.g., FIG. 9). When the auxiliary device is connected to the auxiliary port 36, the auxiliary port may be configured to receive power, if necessary, and/or define a sense loop that may be used to detect various security events associated with the auxiliary device, such as the auxiliary device being removed from the base 18 or electronics module 26 in an unauthorized manner. The auxiliary port 36 may be part of the same sense loop defined with the sensor 12 and the cable 20, or may define a separate sense loop. In the instance where the auxiliary port 36 is configured to provide power, a power box 40 (discussed below) may be configured to determine the power requirements of the auxiliary device and provide the necessary power level to effectuate charging. Therefore, the auxiliary port 36 allows an auxiliary device to be displayed and used by a prospective consumer in connection with an item of merchandise 14, while the retailer is able to also power and protect both the item of merchandise 14 and the auxiliary device from theft with a single security device rather than requiring two separate security devices.

Figure 10:
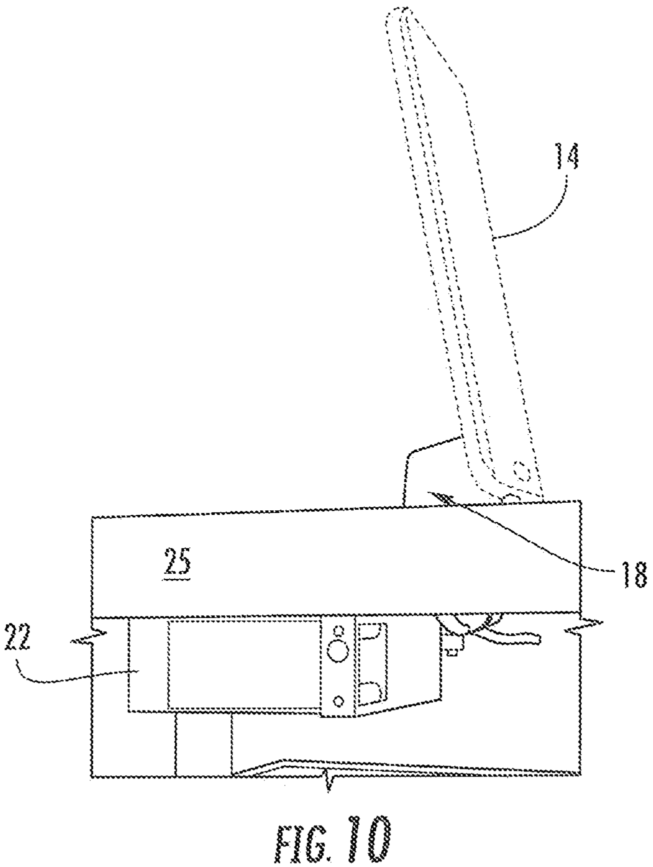
FIG. 10 is a side perspective view of a security system including a recoiler according to one embodiment of the present invention.
Figure 13:
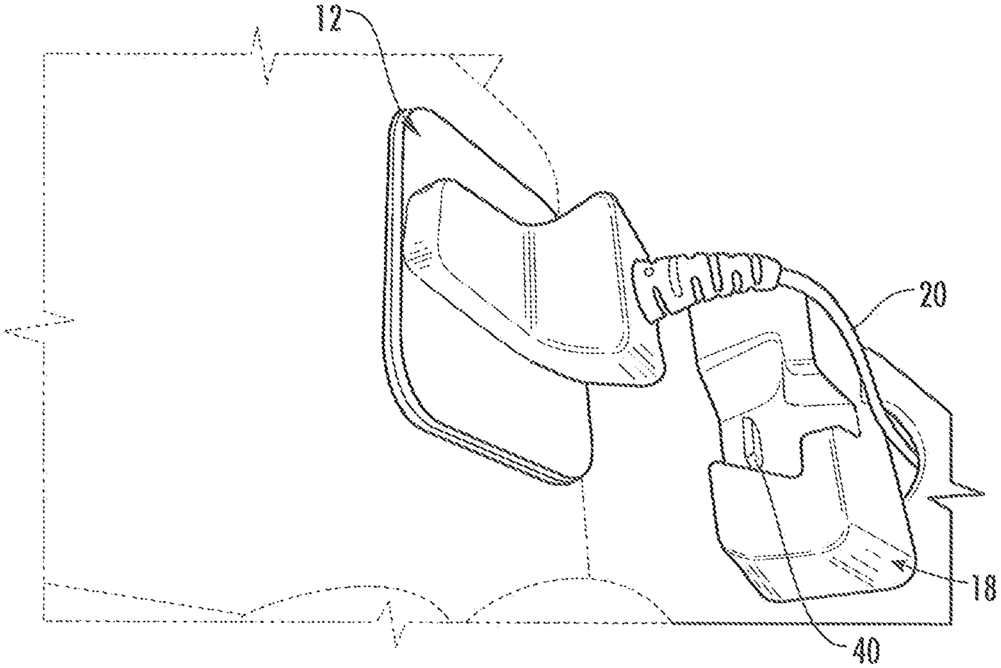
FIG. 13 is a top perspective view of a security system according to another embodiment of the present invention.

As shown in FIGS. 1 and 10, the base 18 may be configured to support the item of merchandise in a vertical orientation. The base 18 may be configured to support the item of merchandise in a vertical orientation despite the sensor only being located on a rear surface of the item. For instance, FIG. 13 demonstrates that the sensor 12 and the base 18 may engage with one another in a dovetail fit. Thus, each of the sensor 12 and base 18 may have a dovetail shape that are configured to mate with one another. In this way, when the base 18 receives the sensor 12, the sensor is supported in both an X- and Y-direction, which not only provides a "clean" appearance to a customer, but also provides additional stability when the sensor is supported on the base.

The security system 10 may include a recoiler 22 and a cable 20 as discussed above. The base 18 may include an opening for receiving the cable 20. As such, the cable 20 may be extended through the opening when the sensor 12 and the item of merchandise 14 are lifted from the base, and the cable may be retracted through the opening when the sensor and the item of merchandise are returned to the base. The recoiler 22 may be spring biased in some embodiments such that the cable 20 is automatically retracted within the recoiler. The recoiler 22 may be mounted to an underside of the support surface 25 (see, e.g., FIG. 10). The cable 20 may include one or more electrical conductors extending along the length of the cable. In some cases, the cable 20 may include a pair of conductors for defining a sense loop or circuit and conducting an electrical signal. In other cases, the cable 20 may include a single conductor, such as an optical conductor for conducting an optical signal (e.g., a fiber optic cable).

Figure 11:
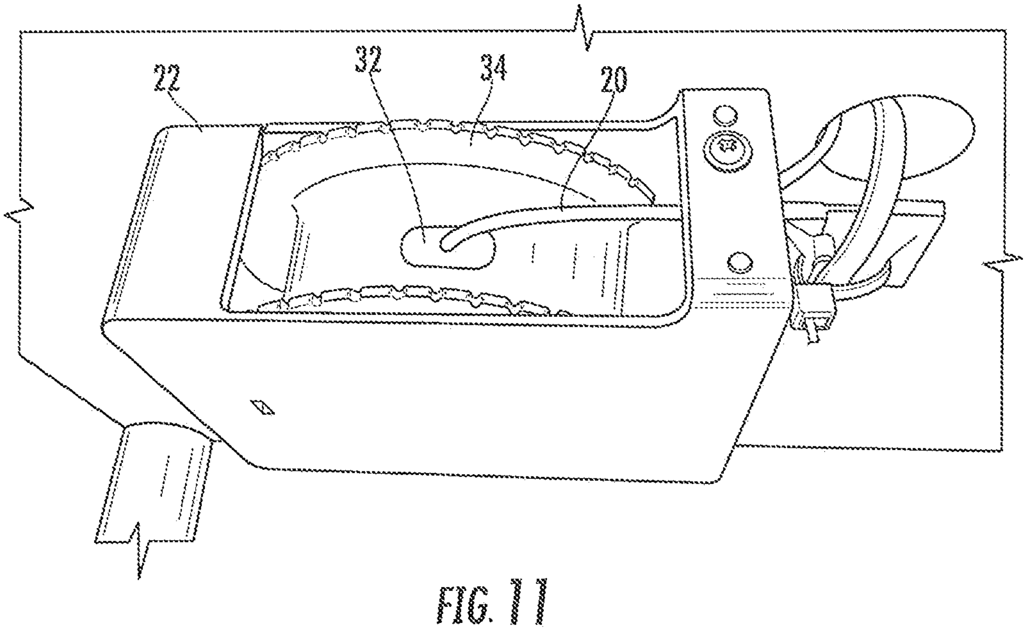
FIG. 11 is a front perspective view of the recoiler shown in FIG. 10.
Figure 12:
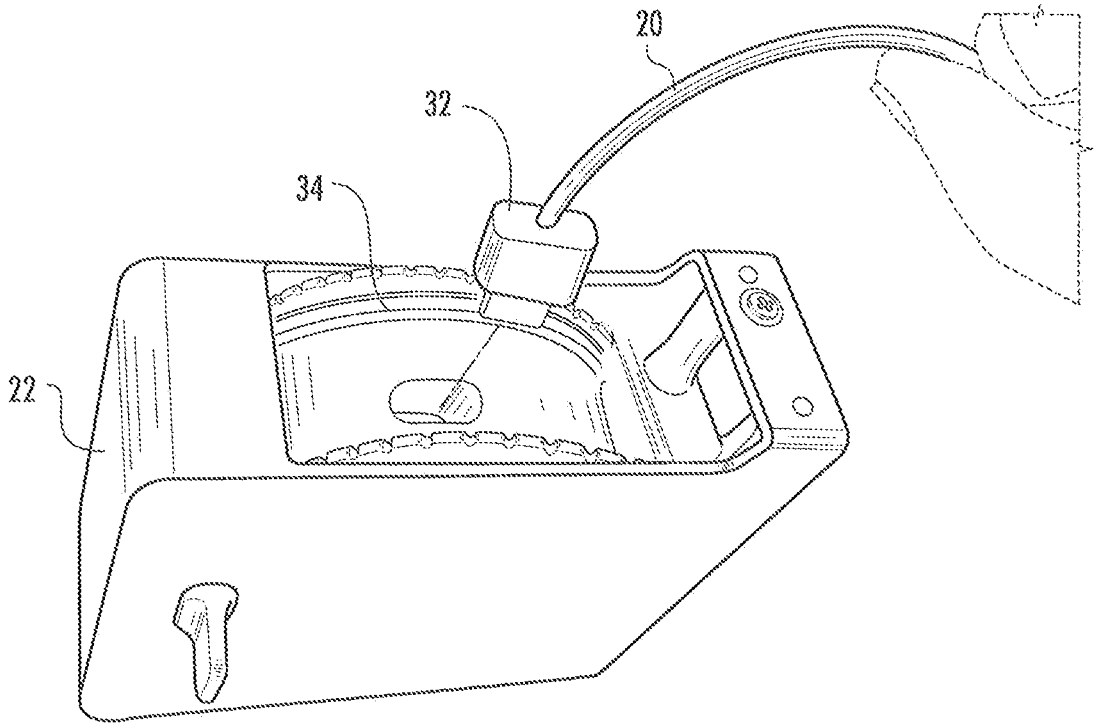
FIG. 12 is another front perspective view of the recoiler shown in FIG. 10 with a connector disconnected therefrom.

In one embodiment shown in FIG. 11, an end of the cable 20 opposite the sensor 12 may include a connector 32 configured to releasably engage the recoiler 22 for establishing electrical communication therebetween. For example, the recoiler 22 and connector 32 may be a USB-type connector. Advantageously, the connector 32 is sized to be routed through an opening defined in the display surface 25 and connected to the recoiler 22. In some cases, the connector 32 is configured to releasably engage a spool 34 located within the recoiler 22, wherein the cable 20 is configured to be wound from and onto the spool. The recoiler 22 may include a switch or latch to maintain the spool 34 within the recoiler in a fixed position when connecting and disconnecting the connector 32.

Figure 7:
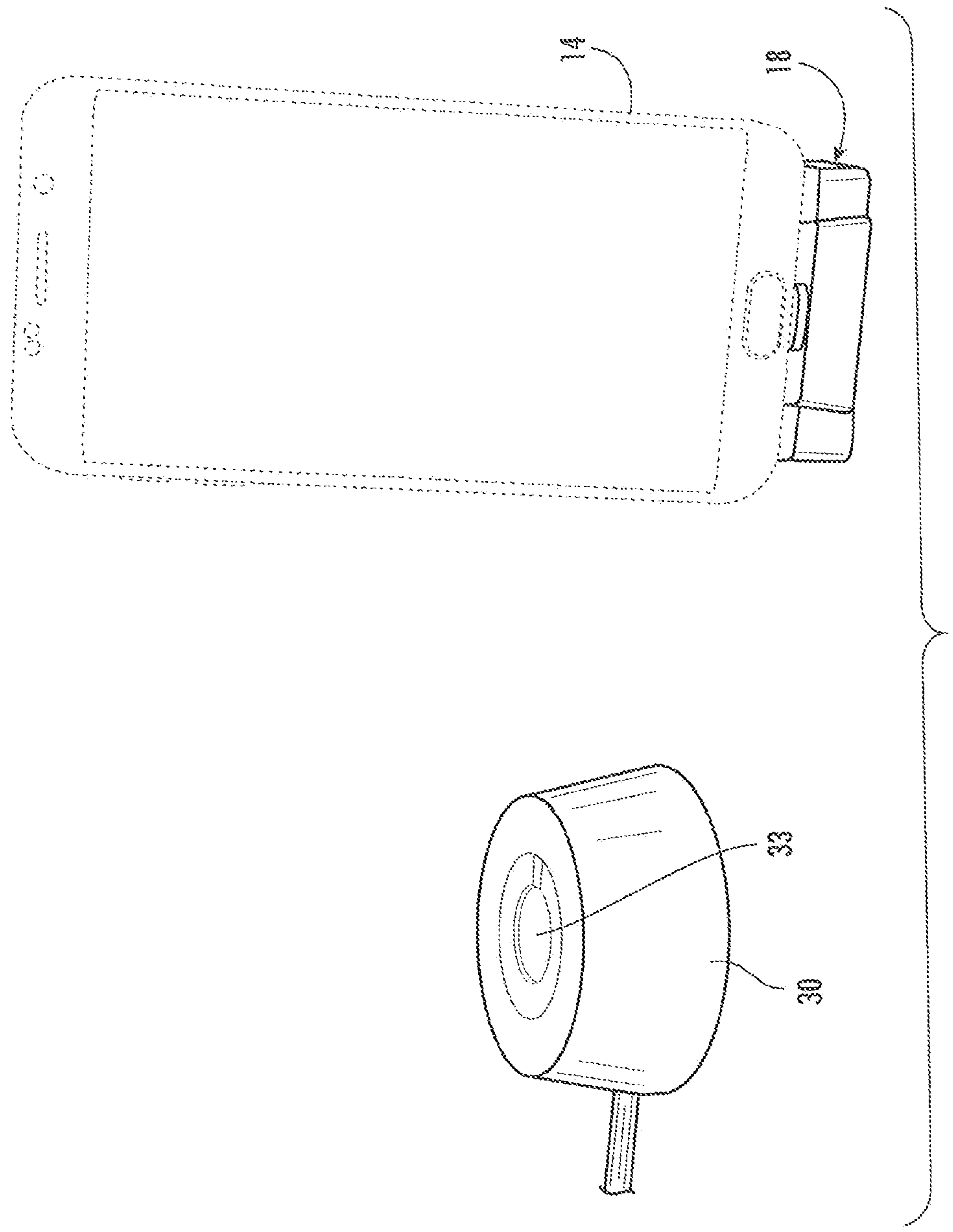
FIG. 7 is a perspective view of a security system including an alarm unit according to one embodiment of the present invention.
Figure 8:
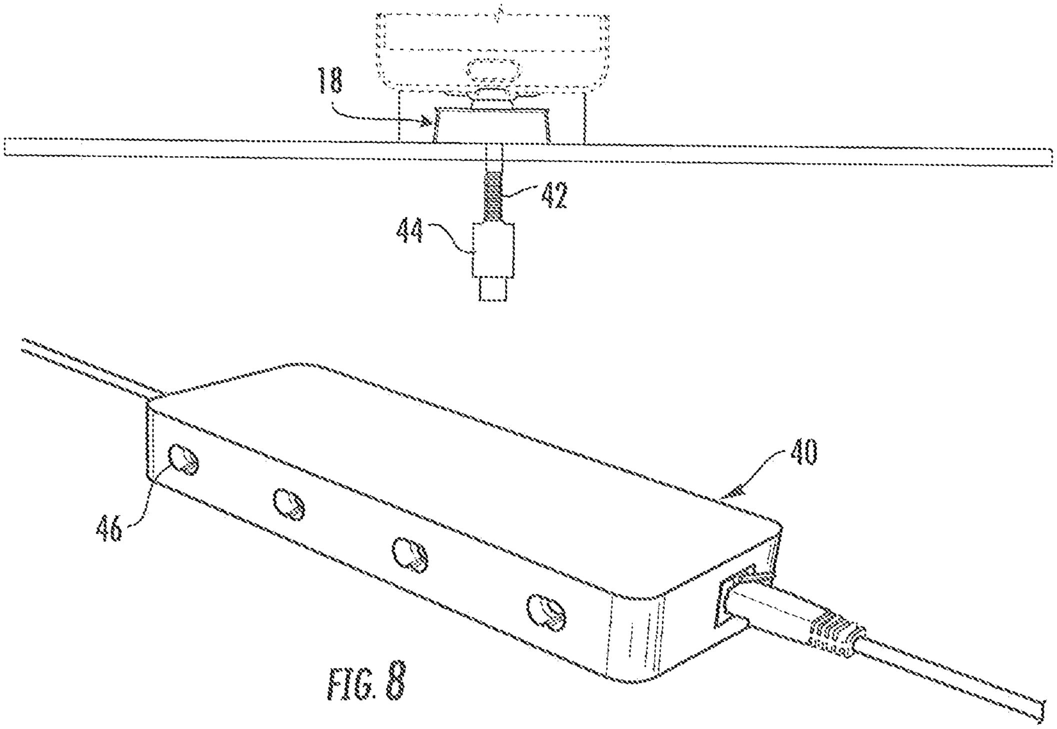
FIG. 8 is a front perspective view of a security system including a power box according to one embodiment of the present invention.

In one embodiment, the security system 10 includes an alarm unit 30. The alarm unit 30 may be a standalone component (see, e.g., FIG. 7) or may be housed by the sensor 12 or the base 18. Furthermore, the alarm unit 30 may include a PCB, circuitry, or the like that is in electrical communication with the cable 20. The alarm unit 30 is configured to generate a security signal in response to various security events, such as generating and audible and/or a visual alarm. Various sensing techniques may be employed for determining whether the cable 20 has been cut or removed from the sensor 12 in an unauthorized manner. For example, the cable 20 may include a pair of electrical conductors that define a sense loop therethrough. Thus, should the sense loop be interrupted (e.g., by cutting or shorting the cable 20), the alarm unit 30 may detect the interruption and generate a security signal. For example, the alarm unit 30 may be configured to generate an audible alarm. The alarm unit 30 may be configured to be armed and/or disarmed via a key, such as a wireless key. For instance, FIG. 7 shows that the alarm unit may include a wireless 33 interface for communicating with a key.

In some embodiments, the electronics module 26 and the sensor 12 include one or more contacts 28, 38 for facilitating the transmission of electrical, security, data and/or communication signals when the sensor is supported on the base. In some embodiments, the sensor 12 includes electrical contacts 28 in the form of a connector as shown in FIG. 3. For instance, the electrical contacts may be a USB connector, such as a USB-C or micro-USB connector. The electrical contacts 28 may be in electrical communication with the PCB in the sensor 12 and the connector 17. Alternatively, the electrical contacts 28 may be electrically connected to only the PCB or the connector 17. In some embodiments, the sensor 12 may not supply power to the item of merchandise 14 when the item is lifted from the base 18. Rather, the item of merchandise 14 may operate using its own power source when lifted from the base 18.

As discussed above, the base 18 or electronics module 26 may include one or more electrical contacts 38. In one embodiment, the contacts 38 of the electronics module 26 may be in the form of a connector, similar to the sensor 12 described above. For example, the sensor 12 may include a female connector while the electronics module 26 includes a male connector. The contacts 28, 38 of the electronics module 26 and the sensor 12 are configured to align and mate with one another when the sensor is supported on the base 18. Thus, the electronics module 26 and the sensor 12 are in electrical communication with one another when the sensor is supported on the base 18. The electronics module 26 may be electrically connected to a power source which is configured to provide power to the electronics module 26 and/or the one or more electrical contacts 28 in the electronics module. The electronics module 26 may also include charging circuitry that is configured to facilitate power transfer from the external power source and the electrical contacts 38. Thus, when the sensor 12 is supported on the base 18, power is able to be transferred between the contacts 28, 38 and to the sensor 12. The connector 17 is electrically connected to the sensor contacts 28 as power is delivered such that power is provided to the item of merchandise 14. Therefore, the item of merchandise 14 may be powered by power transferred thereto and may be used to charge a battery associated with the item of merchandise. Although the aforementioned embodiments describe that power may be transferred via electrical contacts, it is understood that other techniques could be used to transfer power to sensor 12 and the item of merchandise 14. For example, inductive charging functionality could be employed for transferring power.

Figure 4:
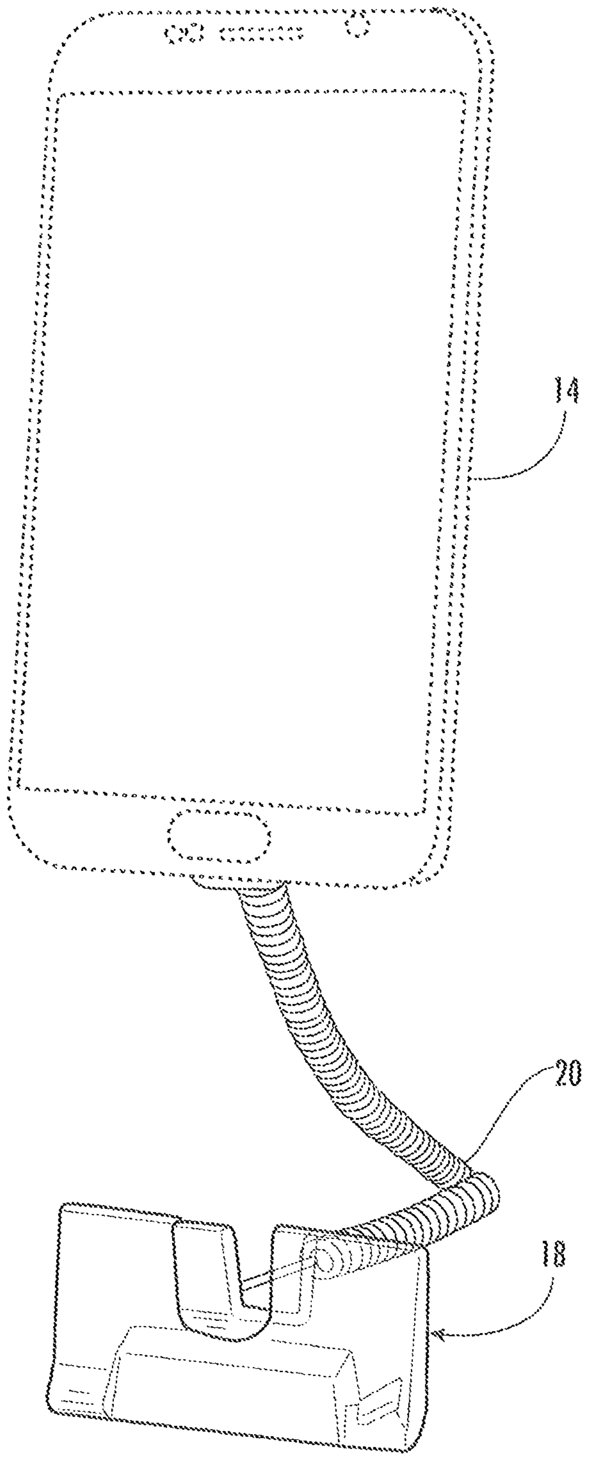
FIG. 4 is a front perspective view of a sensor and a base shown in FIG. 1 coupled with a cable.

It is understood that the cable 20 may be any suitable cord, tether, or the like. In addition, the cable 20 may include one or more electrical conductors for transmitting electrical, security, data and/or communication signals. In addition, the cable 20 may be a single strand, multi-strand, or braided. The cable 20 may be flexible to facilitate extension and retraction relative to the recoiler 22, and in some embodiments, may be formed of a cut-resistant material. Furthermore, the cable 20 may have various cross sections, such as round or flat. In some embodiments, the security system 10 may not include a recoiler 22. Thus, the cable 20 could be a straight or coiled cable that is coupled to the sensor 12 at one end and electrically connected to the base 18 or alarm unit 30 at an opposite end (see, e.g., FIG. 4).

An end of cable 20 may be secured to the sensor 12. It is understood that the end of the cable 20 may be coupled to the sensor 12 using a variety of techniques, such as via a removable connector. In one embodiment, an end of cable 20 may be electrically secured to the sensor 12. The cable 20 may be electrically connected to the sensor 12 for defining a sense loop therethrough, such as via connector 17. For example, the sense loop may be interrupted in response to the connector 17 being removed from the item of merchandise. In some cases, the end of the cable 20 may include a connector that is configured to be releasably secured to the sensor 12, or the cable may be hardwired to the sensor in other embodiments. In one embodiment, the end of the cable 20 may be configured to rotate or swivel relative to the sensor 12 while still providing an electrical connection therebetween.

Figure 5:
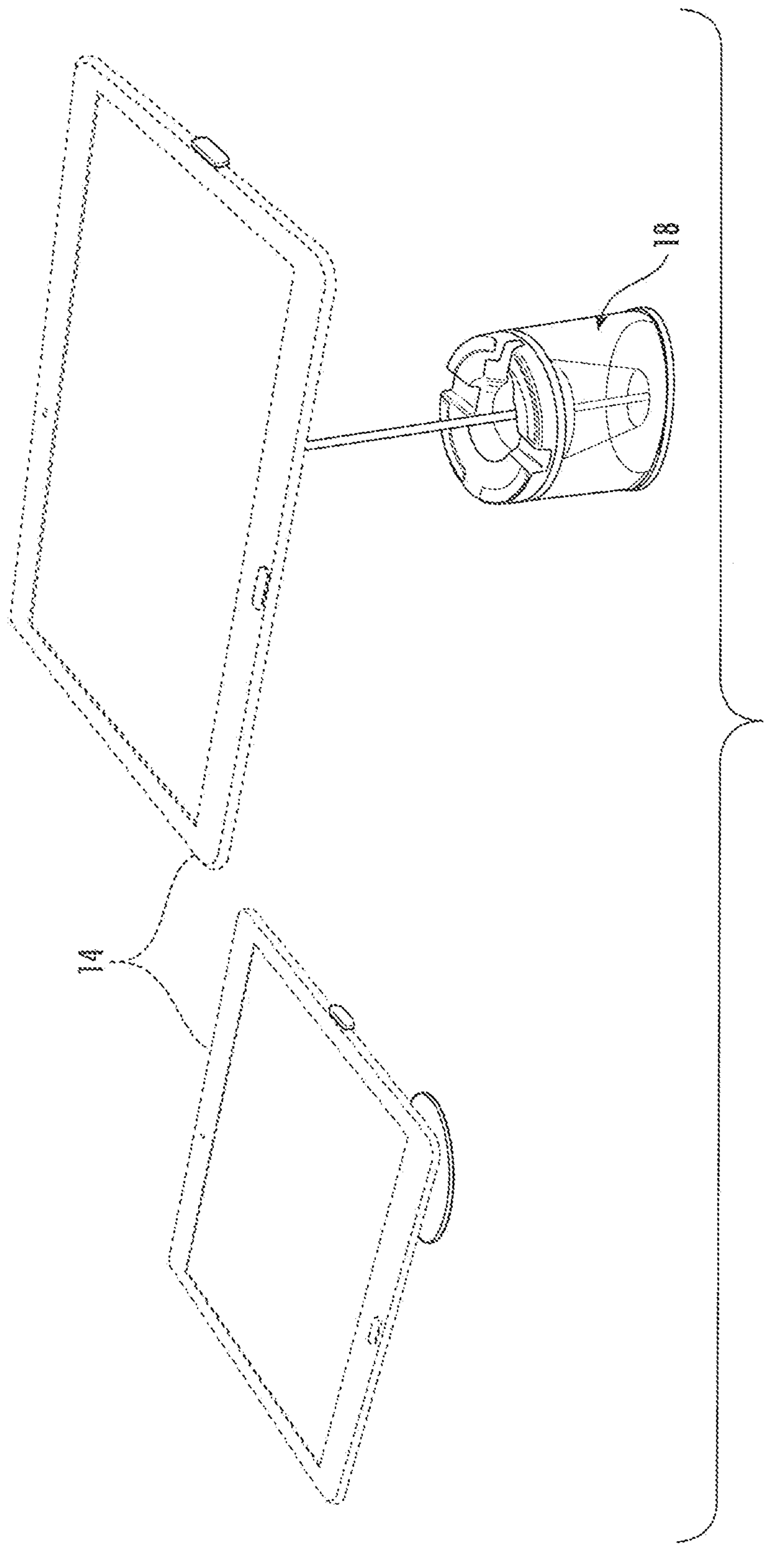
FIG. 5 is a perspective view of a security system according to one embodiment of the present invention.
Figure 6:
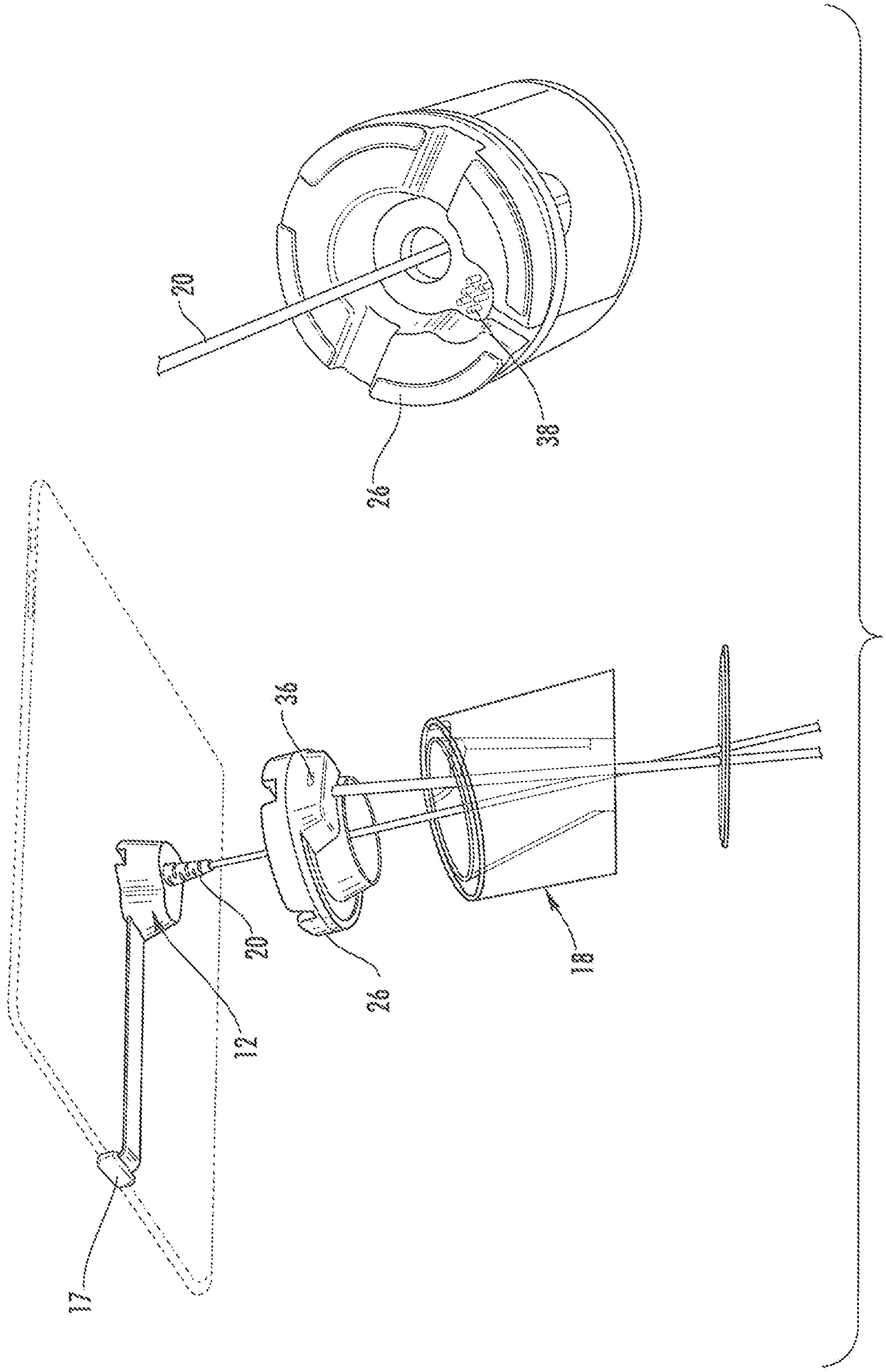
FIG. 6 show front and rear perspective views of a sensor and a base of the security system shown in FIG. 5.

FIGS. 5-6 show an additional embodiment of a security system. The embodiment shown in FIGS. 5-6 may be used for larger items of merchandise 14 such as tablets or the like and function in a similar manner as that described above. As before, the security system includes a sensor 12 secured to an item of merchandise 14 with a connector 17. The base 18 may also include an electronics module 26 as discussed above. In this case, the electronics module 26 is disposed on an upper surface of the base 18 and may be configured to rotate relative to the base. For example, the electronics module 26 may be configured to rotate at least between landscape and portrait orientations while the sensor 12 is supported on the electronics module. As shown in FIG. 6, it can be seen that electrical contacts 38 may be disposed within the electronics module 26. Both the sensor 12 and the electronics module 26 may include mating geometry to facilitate alignment of the sensor on the electronics module.

Figure 9:
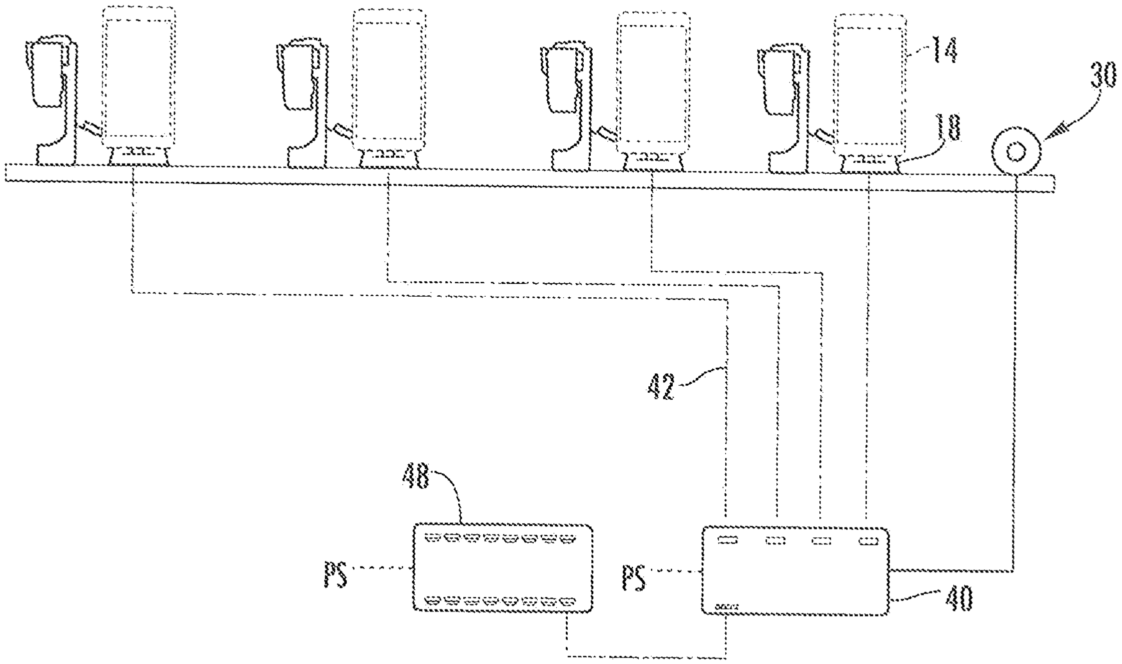
FIG. 9 is a schematic illustrating a security system securing a plurality of items of merchandise and including a power box and a hub according to one embodiment of the present invention.

In one embodiment, the security system 10 includes a power box 40 that is configured to electrically connect to the electronics module 26. The power box 40 may also be electrically connected to an alarm unit 30 or device for disarming the security system. In some instances, the electronics module 26 may include a cable 42 and an associated connector 44 at its end that is configured to releasably engage the power box 40. For example, the connector 44 may be a USB connector such as a USB-C connector. The power box 40 includes one or more input ports 46 for receiving the connector 44. The power box 40 may be configured to communicate with the sensor 12, item of merchandise 14, and or the electronics module 26. In some embodiments, the power box 40 is configured to adapt an input voltage input into the power box to the power requirements of the item of merchandise 14 and to output the adapted voltage to the electronics module 26. In one example, the connector 44 is a USB-C connector that allows for data, security, and power signals to be communicated between the power box 40 and the electronics module 26. The power box 40 may also be configured to utilize the USB Power Delivery (PD) specification for providing power to the item of merchandise 14. In this regard, the power box 40 and the item of merchandise may be configured to communicate with one another to determine the power requirements of the item of merchandise and to then provide the appropriate voltage to the item of merchandise. As shown in FIG. 9, the power box 40 may also be configured to communicate with a hub 48, which may be used to collect, communicate, and/or transfer various data to and from the security system 10 and any number of remote devices. For example, the hub 40 may be configured to collect data from the item of merchandise 14 to determine the make and model and/or collect data regarding the status of the security system. In some embodiments, the power box 40 may include an AC/DC voltage converter for converting an input AC voltage to the desired DC voltage. Thus, the power box 40 may allow for the elimination of a separate AC power source and AC/DC voltage converter. Integrating the voltage converter within the power box 40 may reduce cost of the security system, reduce inefficiencies in power delivery, and reduce the amount of space required by the security system.

Figure 15:
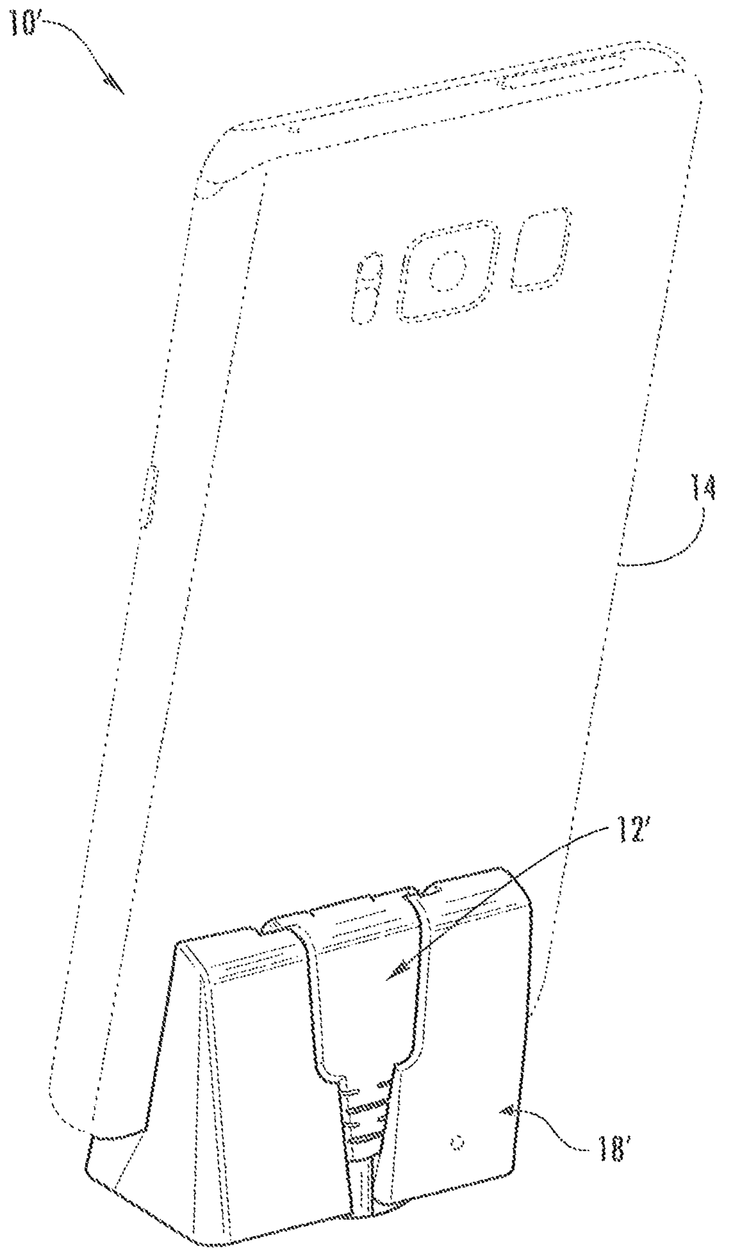
FIG. 15 is a rear perspective view of a security system according to another embodiment of the present invention.
Figure 16:
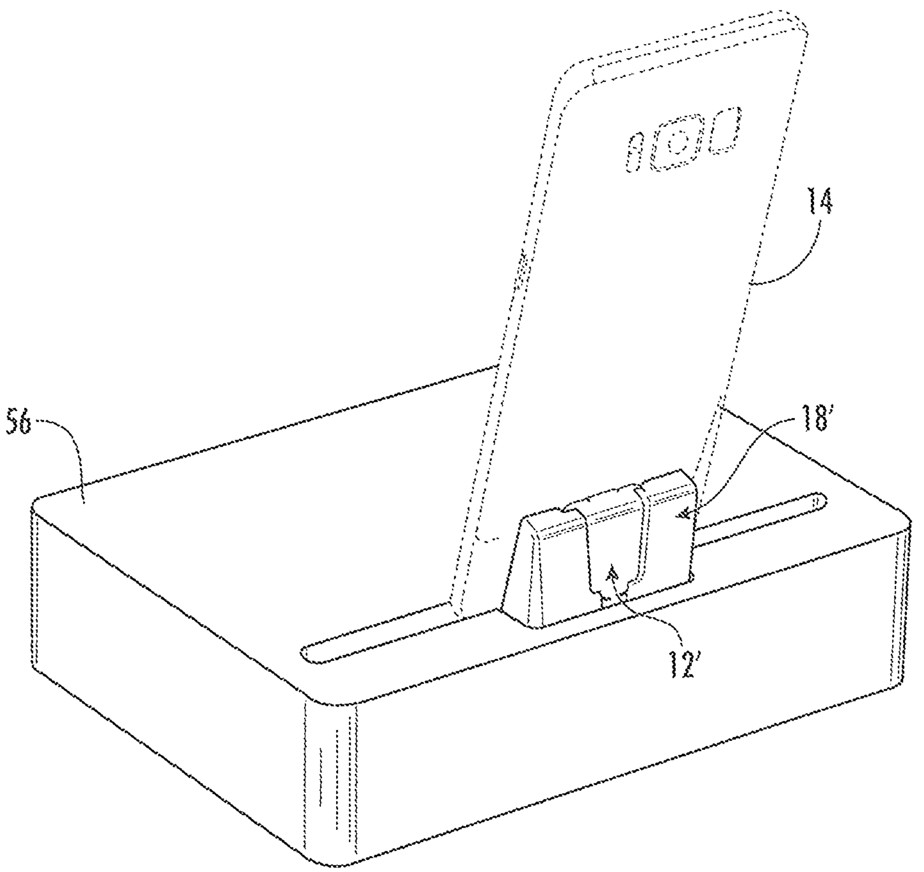
FIG. 16 is a rear perspective view of a security system according to another embodiment of the present invention.
Figure 17:
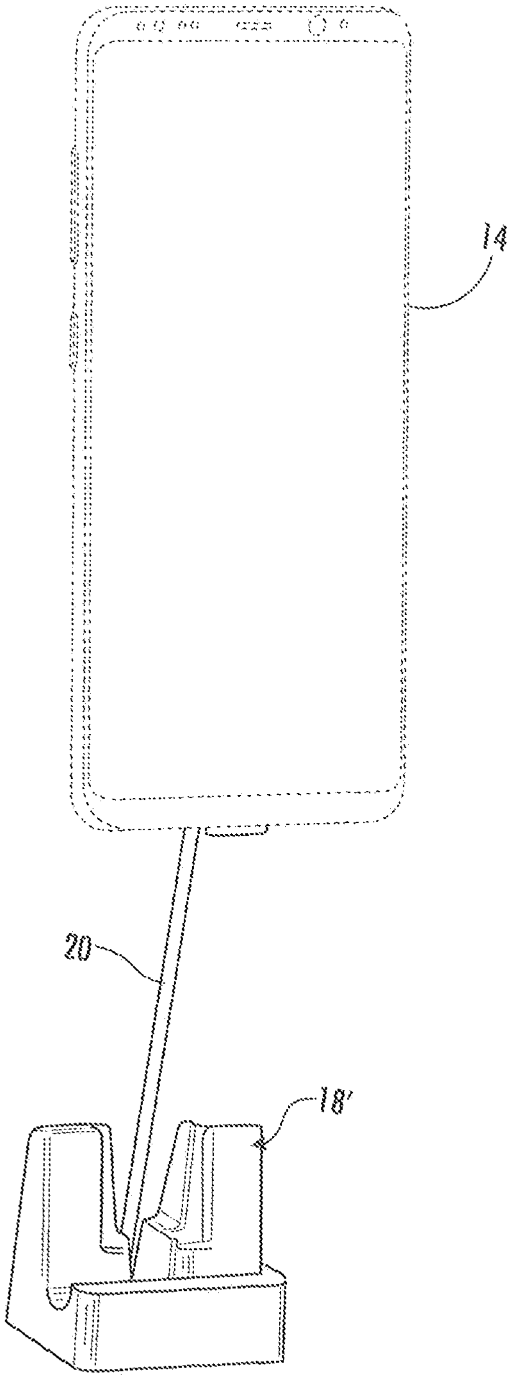
FIG. 17 is a front perspective view of the security system shown in FIG. 15 with the item of merchandise lifted off of the base.
Figure 18:
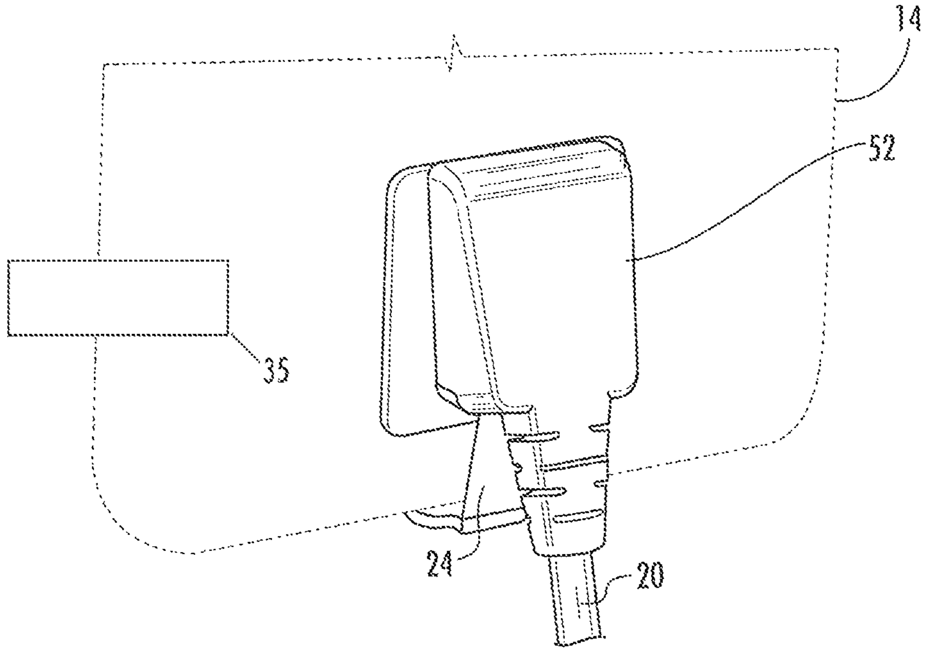
FIG. 18 is an enlarged perspective view of a sensor of the security system shown in FIG. 15.
Figure 19:
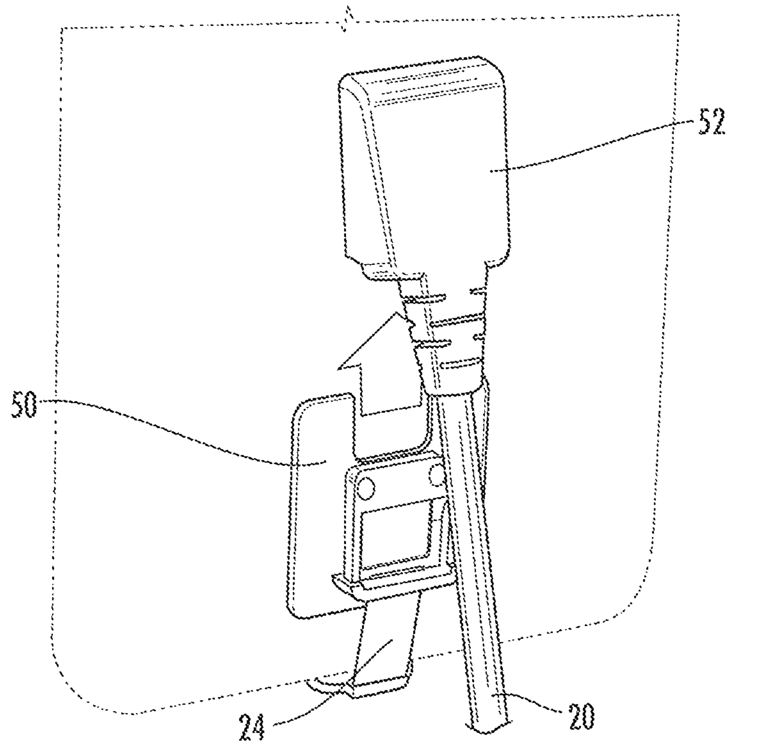
FIG. 19 is an enlarged perspective view of the sensor shown in FIG. 18 removed from a bracket.
Figure 20:
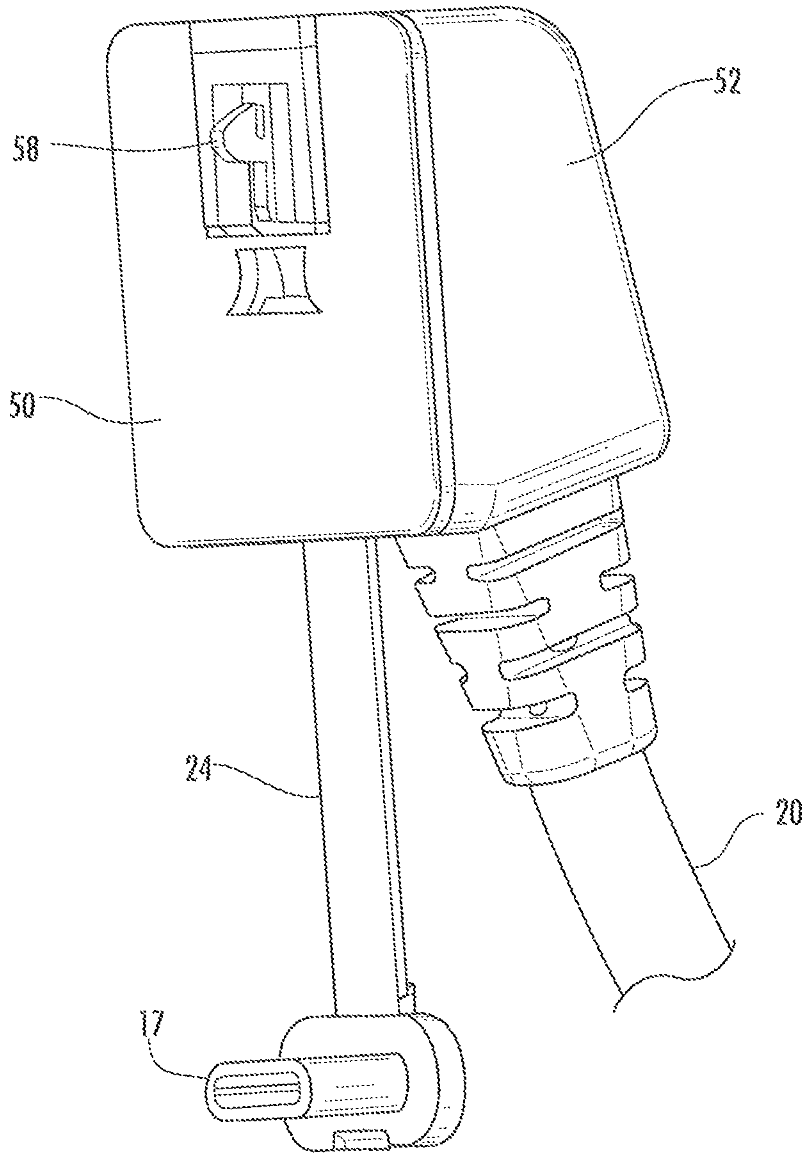
FIG. 20 is a front perspective view of a sensor of the security system shown in FIG. 15.

FIGS. 15-19 illustrate additional embodiments of a security system 10'. In the embodiments shown in FIGS. 15-19, the security system 10' includes a sensor assembly 12' removably supported on a base 18'. The sensor assembly 12' includes a bracket or sled 50 configured to removably engage a sensor 52. The sensor 52 may be connected to a cable 20 similar to that described above. For example, the cable 20 may be coupled to the sensor 52 at one end (e.g., hardwired thereto) and operably engaged with a recoiler 22 at an opposite end. Furthermore, as shown in FIG. 15, the sensor 52 and base 18' may be sized and configured to mate with one another in a sliding engagement such that an outer surface of the sensor is flush to an outer surface of the base in at least one plane. Moreover, the base 18' may be a standalone component as shown in FIG. 15 or may be housed or otherwise integrated with a module 56 that is configured to contain the recoiler 22 therein. Thus, the module 56 may be configured to be positioned on a display surface 25 as opposed to positioning the recoiler 22 below the display surface.

The bracket 50 may be secured to the item of merchandise 14 with any one or combination of adhesives, fasteners, or brackets. The bracket 50 is configured to remain on the item of merchandise 14 when the sensor 52 is removed, which may be useful for remerchandising or daily removal of the item of merchandise for safe storage after business hours in a retail store. The sensor 52 may be configured to slidably engage the bracket 50 in some cases, e.g., in a dovetail type engagement. In the illustrated example, the bracket 50 is configured to be secured to a rear surface of the item of merchandise 14, and the sensor 52 is configured to slide in the same plane as the bracket and the rear surface to engage the bracket.

Figure 21:
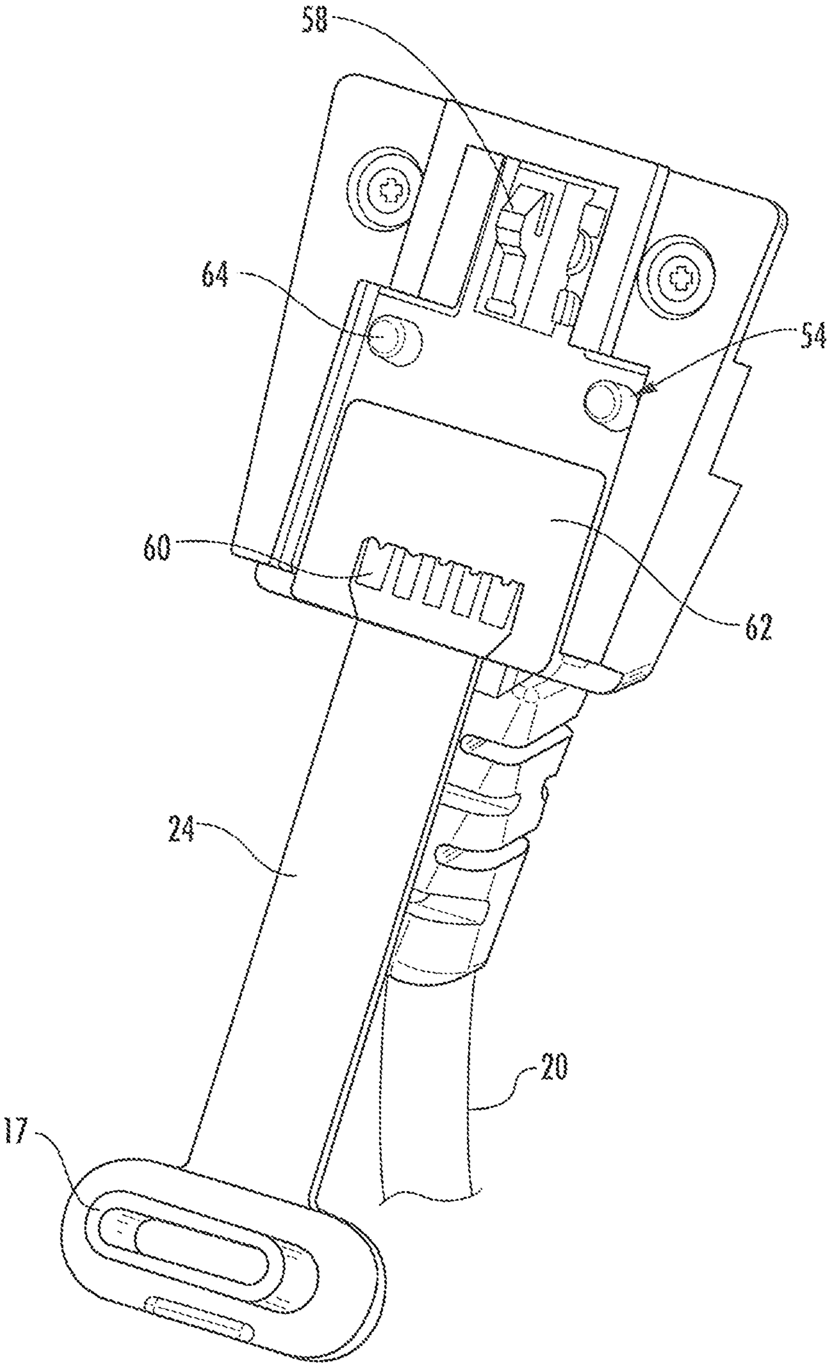
FIG. 21 is a front perspective view of the sensor shown in FIG. 20 with the bracket removed.
Figure 22:
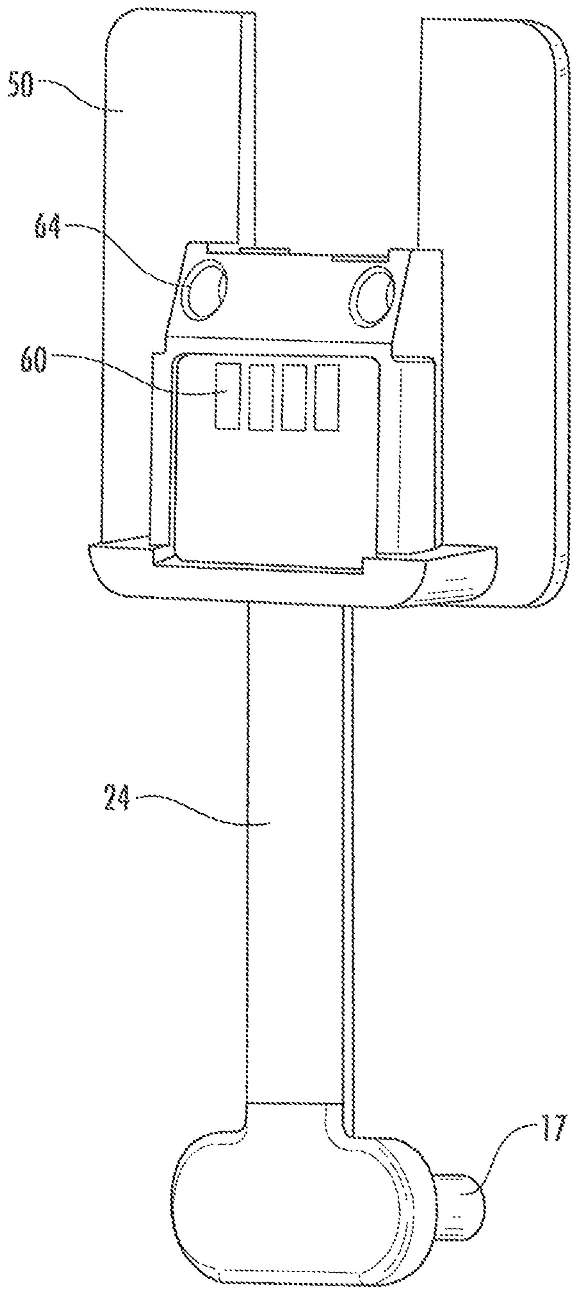
FIG. 22 is a front perspective view of the bracket shown in FIG. 20 with the sensor removed.
Figure 23:
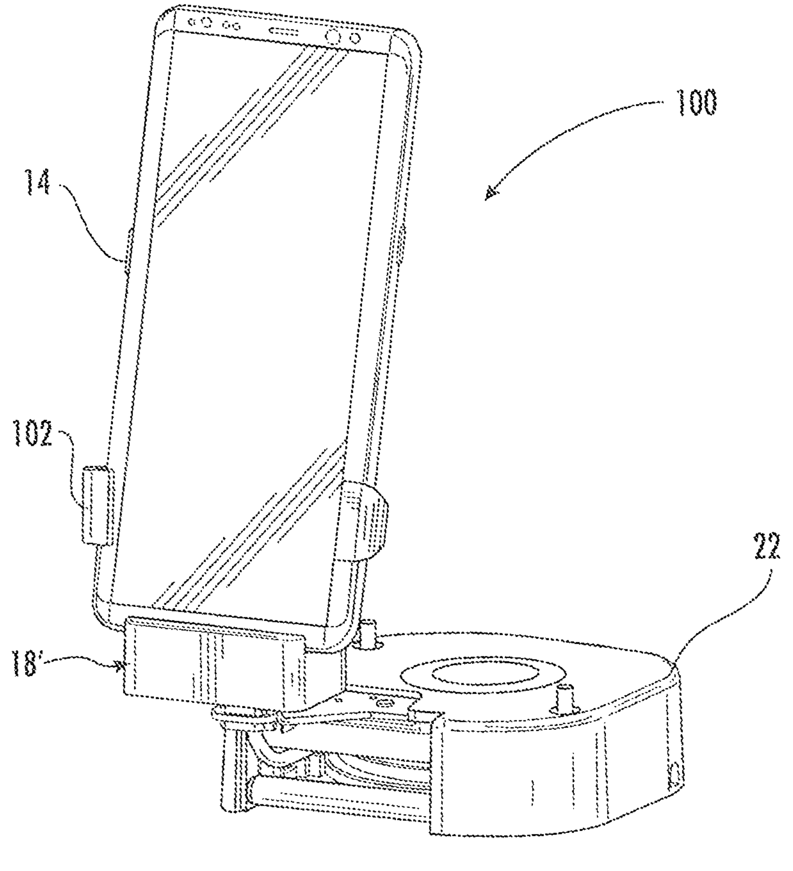
FIG. 23 is a front perspective view of a security system according to another embodiment of the present invention.

Moreover, the sensor 52 may lock to the bracket 50 when in engagement therewith. For example, as shown in FIG. 21 the sensor 52 may include a lock mechanism 54 that is configured to engage the bracket 50 such that a key 35 is required in order to unlock the lock mechanism prior to removing the sensor from the bracket. The lock mechanism 54 may include one or more engagement members 64 configured to releasably engage one or more associated engagement members 64 of the bracket 50. In some embodiments, the lock mechanism 54 is magnetically actuated such that a magnetic key is needed to disengage the lock mechanism from the bracket. In one instance, the lock mechanism 54 is biased towards a locked position such that the lock mechanism automatically engages the bracket 50 when the sensor is moved to an engaged position with the bracket. Moreover, the sensor 52 may include a switch 58 for detecting removal of the sensor from the item of merchandise 14 and/or the bracket 50. In one example, the lock mechanism 54 may be integrated with the switch 58 in a single component for detecting removal of the sensor.

As also similar to the embodiments described above, the sensor 52 may include a low profile flexible circuit 24 and associated connector 17. In this embodiment, the flexible circuit 24 and the sensor 52 may be configured to electrically connect to one another when the sensor is in engagement with the bracket 50. For instance, an end of the flexible circuit 24 may include one or more electrical contacts 60 that are configured to align with and contact one or more electrical contacts 66 on the sensor (e.g., contacts on PCB 62) when the sensor is in engagement with the bracket 50 for establishing an electrical connection between the connector 17, flexible circuit 24, sensor 52, and the cable 20. Thus, because the flexible circuit 24 is not soldered to the PCB 62 of the sensor, the flexible circuit 24 and associated connector 17 may be modular and capable of being swapped out for different types of items of merchandise 14 that have different input connector types.

Figure 24:
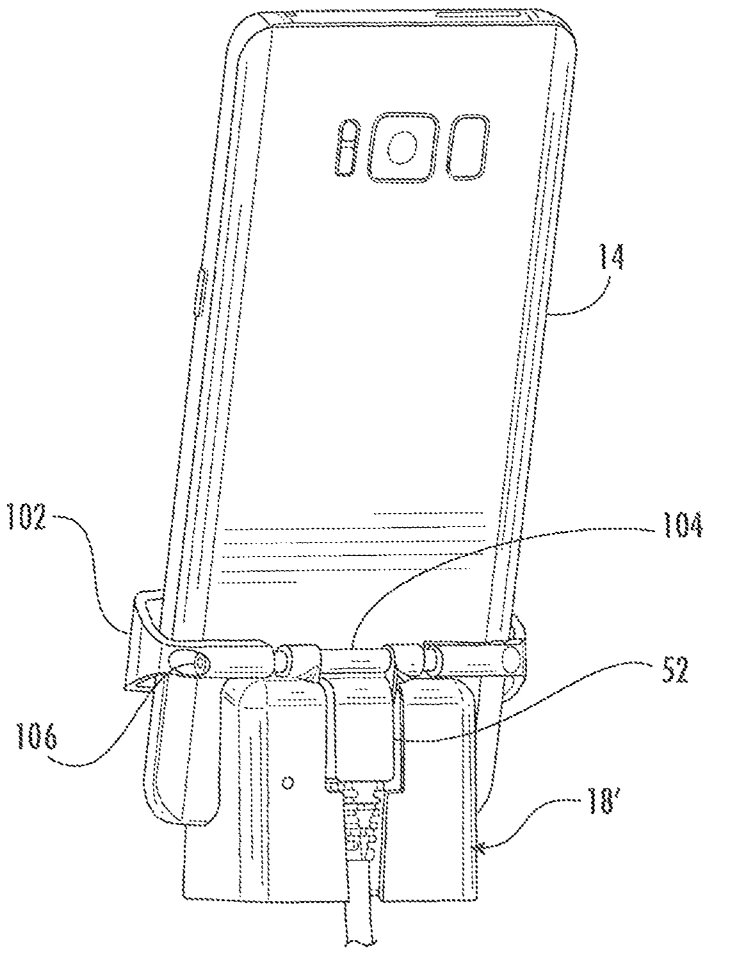
FIG. 24 is rear perspective view of the security system shown in FIG. 23 illustrating a sensor and a base.
Figure 25:
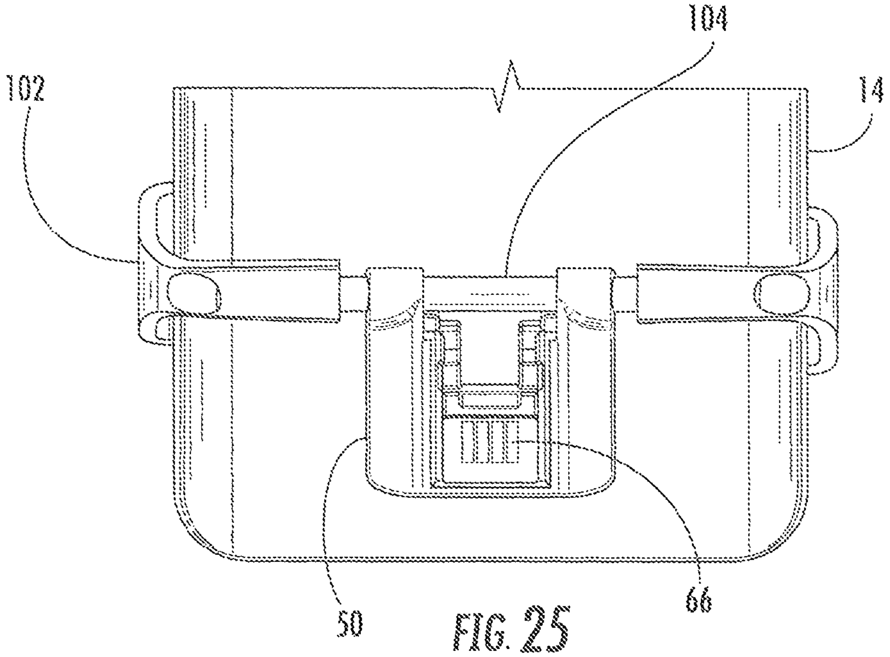
FIG. 25 is an enlarged rear view of a bracket and bracket arms of the security system shown in FIG. 23.

FIGS. 23-27 illustrate a security system 100 according another embodiment of the present invention. In this embodiment, the security system 100 includes a sensor 52 and a base 18' similar to that described above. However, FIGS. 24-25 show that the security system 100 includes a bracket assembly comprising at least one bracket arm 102 configured to engage the item of merchandise 14. In this particular example, a pair of bracket arms 102 are shown and are configured to engage the sides of the item of merchandise 14. In some cases, the bracket arms 102 are connected by a rod 104 or like connection member, and the bracket arms 102 may be adjustable relative to one another along the rod. For instance, one or more adjustment members 106 may be used to adjust the location of the bracket arms 102, such as be rotation of a fastener engaged with the rod. Thus, rotation of the fastener in a clockwise or counterclockwise direction may adjust the position of the bracket arm 102 on the rod. One adjustment member 106 could be used to adjust the location of the bracket arms 102, or each bracket arm may have its own adjustment member.

In some embodiments, the bracket 50 is in engagement with the rod 104 as shown in FIG. 25. As shown, the bracket 50 may include one or more engagement members 106 configured to receive the rod 104. Thus, when the sensor 52 is removed from the bracket 50, the bracket arms 102 and rod 104 may remain attached to the item of merchandise 14. Furthermore, in some cases, the rod 104 and/or bracket arms 102 may block removal of the sensor 52 from the bracket 50. For instance, the bracket arms 102 and rod 104 may be assembled to the bracket 50 after the sensor 52 engages the bracket. Therefore, due to the size and location of the bracket 50 and the rod 104, the sensor 52 is unable to be slid out of engagement with the bracket 50 since the bracket and/or the rod prohibits sliding movement of the sensor relative to the bracket.

Figure 26:
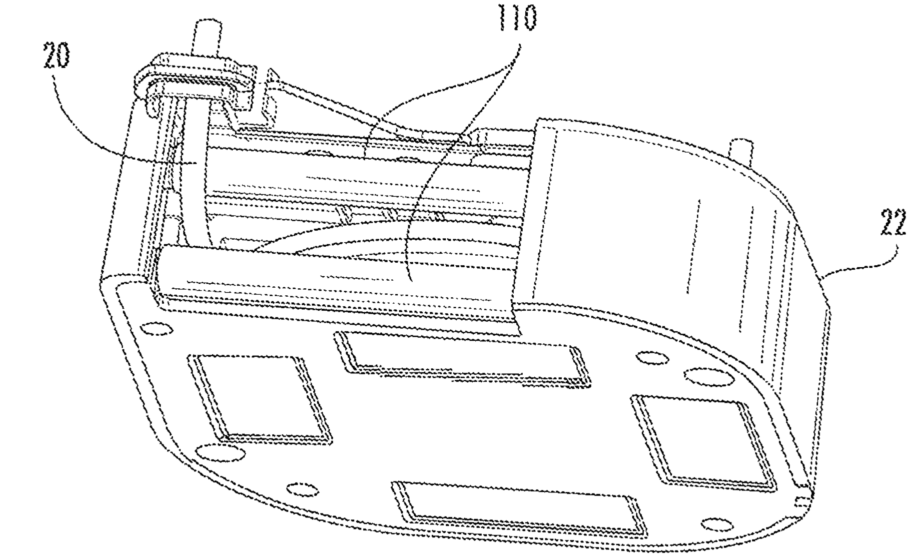
FIG. 26 is a perspective view of a recoiler of the security system shown in FIG. 23.
Figure 27:
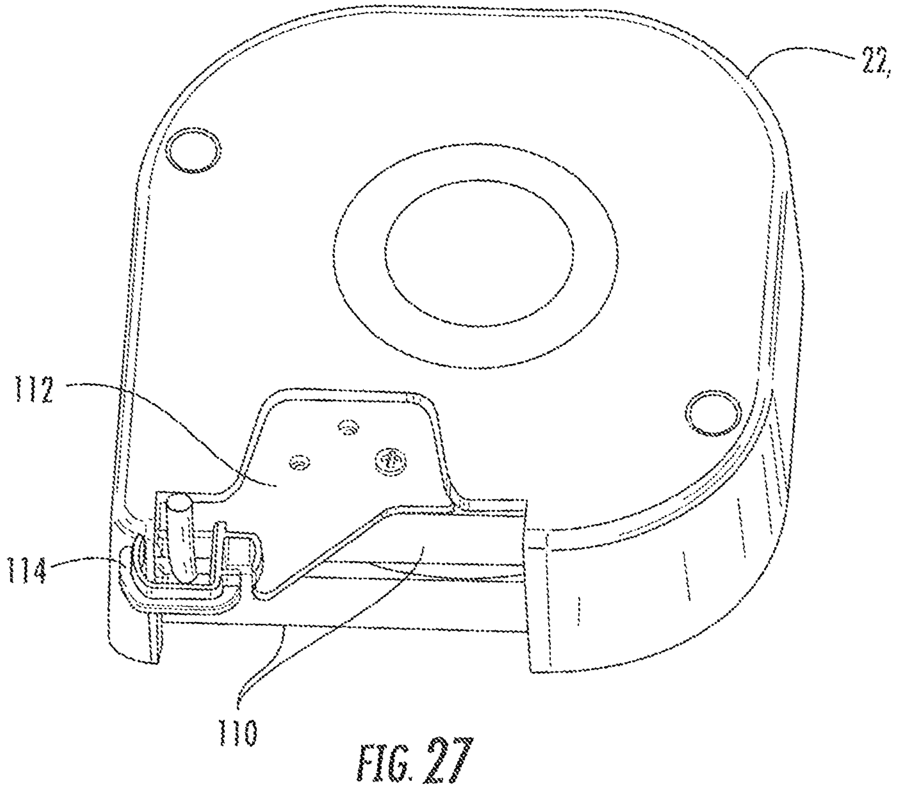
FIG. 27 is another perspective view of the recoiler of the security system shown in FIG. 23.

FIGS. 26-27 illustrate another embodiment of a recoiler 22'. In this embodiment, the recoiler 22' includes at least one roller 110 that is configured to guide the cable 20 as the cable is extended and retracted from the recoiler. In some cases, the roller 110 is elongated. As illustrated, the length of the roller 110 may be greater than at least half of the width of the recoiler 22'. In this way, the cable 20 is able to exit the recoiler 22' at any number of locations and provides more flexibility in where the recoiler is able to be located relative to a support surface 25, wherein there may be various obstructions or space limitations for the recoiler. In some embodiments, the recoiler 22' may include a bracket 112 that is attachable to the recoiler and includes a guide member 114 to facilitate a desired exit location of the cable 20 (e.g., at one end of a side of the recoiler). It is understood that different brackets 112 and guide members 114 may be employed depending on the desired exit location of the cable 20. In addition, the location of the bracket 112 could be flipped 180 degrees and attached to the recoiler 22' to facilitate an exit location at the center of one side of the recoiler. Furthermore, in some embodiments, the recoiler 22' includes a plurality of rollers 110, which may allow for even greater flexibility of the position of the recoiler and the exit location of the cable 20. For example, the rollers 110 may allow the recoiler 22' to be flipped 180 degrees horizontally and attached to the support surface 25.

Figure 28:
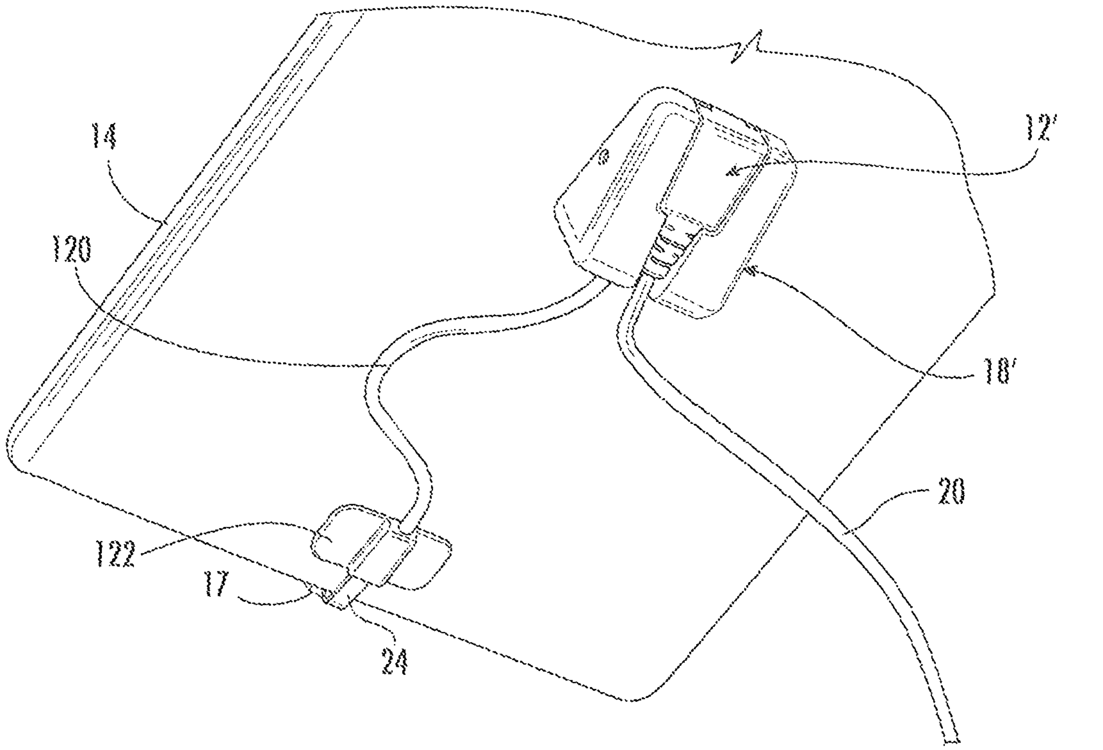
FIG. 28 is a perspective view of a security system according to another embodiment of the present invention.

In another embodiment shown in FIG. 28, the base 18' may be configured to be secured directly to the item merchandise 14 and is also configured to be engaged by the sensor 12'. This embodiment may be useful with larger items of merchandise 14, such as tablets. The sensor 12' and the base 18' may in turn be configured to be placed on and supported by a display surface 25 or a separate base supported on the display surface. In this example, the sensor 12' and/or the base 18' may be electrically connected to the flexible circuit 24 and connector 17 with a cable 120 via a connection member 122. For instance, the base 18' may be electrically connected to the cable 120, and the sensor 12' may be electrically connected to the cable 20. In some cases, the cable 120 may be connected to the flexible circuit 24 with a connection member 122 comprising an over mold whereby the electrical conductors of the flexible circuit and the cable are electrically connected to one another (e.g., via soldering). In this way, the flexible circuit 24 is electrically connected to the cable 120, wherein the flexible circuit and the cable are different shapes and arrangement of conductors. The connection member 122 could be attached directly to the item of merchandise 14, such as with an adhesive. The connection member 122 may be formed of a flexible material. The cable 120 and the connection member 122 may allow for more flexible positioning of the sensor 12' relative to the item of merchandise 14, and use of a cable 120 may be easier to route and less susceptible to wear rather than routing the flexible circuit 24 to the sensor 12'.

The foregoing has described one or more embodiments of security systems for securing an item of merchandise from theft or unauthorized removal. Although various embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

That which is claimed is:

1. A security system for securing an item of merchandise from theft or unauthorized removal, the security system comprising:

a sensor assembly comprising:

a first portion configured to be attached to a rear surface of an item of merchandise;

a plurality of bracket arms configured to engage the first portion and a respective side of the item of merchandise;

a second portion configured to releasably engage the first portion, the second portion configured to be removed from the first portion while the first portion and the plurality of bracket arms remain attached to the item of merchandise;

a connector configured to removably engage an input port of the item of merchandise; and a lock mechanism configured to releasably lock the first portion and the second portion so as to prevent removal of the first portion from the second portion, wherein the sensor assembly is configured to detect unauthorized removal of the sensor assembly or the connector from the item of merchandise, wherein the first portion comprises one or more electrical contacts, and wherein the second portion comprises one or more electrical contacts for establishing an electrical connection with the one or more electrical contacts of the first portion when the second portion is engaged with the first portion, and wherein the connector is configured to establish an electrical connection with the sensor assembly when the first portion is engaged with the second portion and the one or more electrical contacts of the first portion and the second portion are electrically connected to one another.

2. The security system of claim 1, wherein the first portion is configured to slidably engage the second portion.

3. The security system of claim 1, wherein the lock mechanism is configured to be magnetically actuated.

4. The security system of claim 1, wherein the lock mechanism is biased towards a locked position.

5. The security system of claim 1, further comprising a key configured to unlock the lock mechanism to facilitate removal of the first portion from the second portion.

6. The security system of claim 1, wherein the connector is releasably engaged with the second portion.

7. The security system of claim 1, wherein the first portion is configured to slidably engage the second portion in the same plane as the first portion and the rear surface of the item of merchandise.

8. The security system of claim 1, wherein the sensor assembly further comprises a flexible circuit having the connector at one end.

9. The security system of claim 1, wherein the first portion is configured to engage the second portion in a dovetail engagement.

10. The security system of claim 1, wherein the sensor assembly is configured to detect unauthorized removal of the connector from the input port.

11. The security system of claim 10, further comprising a cable electrically connected to the sensor assembly, the cable comprising at least one conductor for defining a sense loop.

12. The security system of claim 11, further comprising an alarm unit operably engaged with the cable and configured to generate a security signal when the sensor assembly or the connector is removed from the item of merchandise or the sense loop is interrupted.

13. The security system of claim 11, further comprising a recoiler connected to the cable.

14. The security system of claim 11, wherein the sensor assembly houses the alarm unit.

15. The security system of claim 1, wherein the sensor assembly further comprises an adjustment member for adjusting the location of the bracket arms relative to one another.

16. The security system of claim 15, wherein each of the plurality of bracket arms comprises a respective adjustment member.

17. The security system of claim 15, wherein the adjustment member is a fastener such that rotation of the fastener adjusts the location of the bracket arms relative to one another.

18. The security system of claim 1, wherein the plurality of bracket arms are configured to prevent removal of the first portion from the second portion.

19. The security system of claim 1, wherein the first portion is a bracket and the second portion is a sensor.

20. The security system of claim 1, wherein the lock mechanism comprises at least one engagement member configured to bias into engagement with the first portion.

21. The security system of claim 1, wherein the sensor assembly comprises an electrical circuit extending between the connector and the one or more contacts of the first portion.

22. The security system of claim 1, wherein the second portion is configured to be removed from the first portion while the connector remains engaged with the input port.

* * * * *